(12) United States Patent
Tsuchiya

(10) Patent No.: US 8,517,275 B2
(45) Date of Patent: Aug. 27, 2013

(54) SEMICONDUCTOR DEVICE

(75) Inventor: Kaoru Tsuchiya, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 886 days.

(21) Appl. No.: 12/003,147

(22) Filed: Dec. 20, 2007

(65) Prior Publication Data
US 2008/0156886 A1 Jul. 3, 2008

(30) Foreign Application Priority Data
Dec. 27, 2006 (JP) ................................. 2006-353336

(51) Int. Cl.
*G06K 19/06* (2006.01)

(52) U.S. Cl.
USPC ........... 235/492; 235/487; 257/528; 257/723; 257/724; 257/728

(58) Field of Classification Search
USPC ................. 235/492, 487; 257/528, 723, 724, 257/728; 438/19
See application file for complete search history.

(56) References Cited

U.S. PATENT DOCUMENTS

| | | | |
|---|---|---|---|
| 4,725,926 A * | 2/1988 | Morimoto et al. ............ | 361/502 |
| 5,055,968 A | 10/1991 | Nishi et al. | |
| 5,643,804 A | 7/1997 | Arai et al. | |
| 5,877,533 A | 3/1999 | Arai et al. | |
| 6,284,406 B1 | 9/2001 | Xing et al. | |
| 6,410,960 B1 | 6/2002 | Arai et al. | |
| 6,636,284 B2 | 10/2003 | Sato | |
| 6,984,894 B2 * | 1/2006 | Rumsey ........................ | 257/774 |
| 7,123,314 B2 | 10/2006 | Matsunaga et al. | |
| 7,284,703 B2 | 10/2007 | Powell et al. | |
| 7,368,318 B2 | 5/2008 | Yamazaki | |
| 2004/0131761 A1 * | 7/2004 | Shakespeare ................... | 427/58 |
| 2004/0155634 A1 * | 8/2004 | Sasaki ........................... | 323/263 |
| 2005/0130389 A1 * | 6/2005 | Yamazaki et al. ............ | 438/455 |
| 2005/0254183 A1 | 11/2005 | Ishida et al. | |
| 2006/0009251 A1 | 1/2006 | Noda et al. | |
| 2006/0118638 A1 * | 6/2006 | Odake et al. .................. | 235/492 |
| 2006/0209060 A1 | 9/2006 | Tanada et al. | |
| 2007/0018832 A1 * | 1/2007 | Beigel et al. ............... | 340/572.7 |

(Continued)

FOREIGN PATENT DOCUMENTS

| | | |
|---|---|---|
| EP | 0350235 A | 1/1990 |
| JP | 02-125797 A | 5/1990 |

(Continued)

*Primary Examiner* — Michael G Lee
*Assistant Examiner* — Tabitha Chedekel
(74) *Attorney, Agent, or Firm* — Eric J. Robinson; Robinson Intellectual Property Law Office, P.C.

(57) ABSTRACT

A semiconductor device that is resistant to bending stress and has a structure in which an antenna circuit, an electric double layer capacitor for storing electricity, and the like are formed over a signal processing circuit that is provided over a substrate and has a charging circuit. The signal processing circuit having the charging circuit is provided over a substrate, and the antenna circuit and the electric double layer capacitor are provided over the signal processing circuit. The antenna circuit is electrically connected to the signal processing circuit, and the electric double layer capacitor is electrically connected to the charging circuit. With such a structure, a wiring for connecting the charging circuit and the electric double layer capacitor can be made short. Accordingly, a semiconductor device that is resistant to bending stress can be provided.

14 Claims, 26 Drawing Sheets

(56) References Cited

U.S. PATENT DOCUMENTS

| | | |
|---|---|---|
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2008/0169349 A1* | 7/2008 | Suzuki et al. .................. 235/492 |

FOREIGN PATENT DOCUMENTS

| | | |
|---|---|---|
| JP | 2001-195307 A | 7/2001 |
| JP | 2002-075801 A | 3/2002 |
| JP | 2002-149089 | 5/2002 |
| JP | 2004-221531 A | 8/2004 |
| JP | 2005-051223 | 2/2005 |
| JP | 2005-316724 | 11/2005 |
| JP | 2006-024087 | 1/2006 |
| JP | 2006-503376 | 1/2006 |
| JP | 2006-121060 A | 5/2006 |
| JP | 2006-127363 A | 5/2006 |
| WO | WO 01/97300 | 12/2001 |
| WO | WO 2004/036482 | 4/2004 |

* cited by examiner

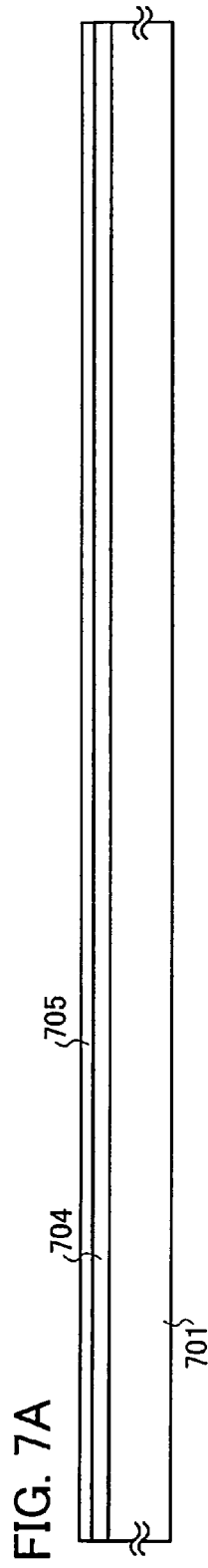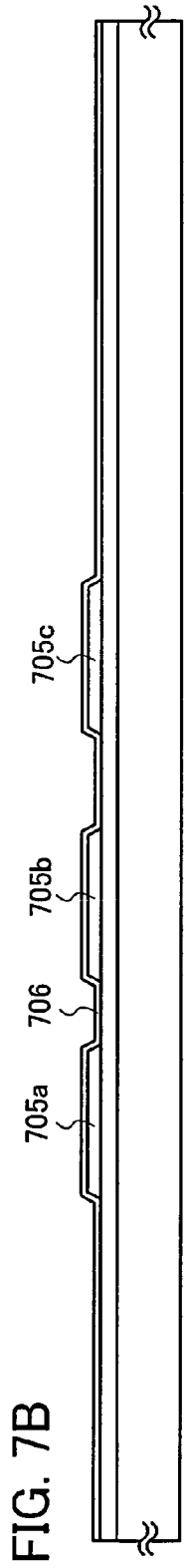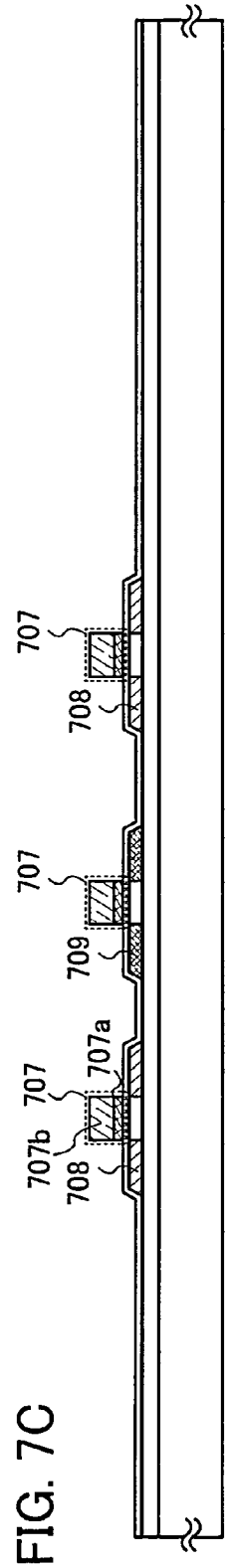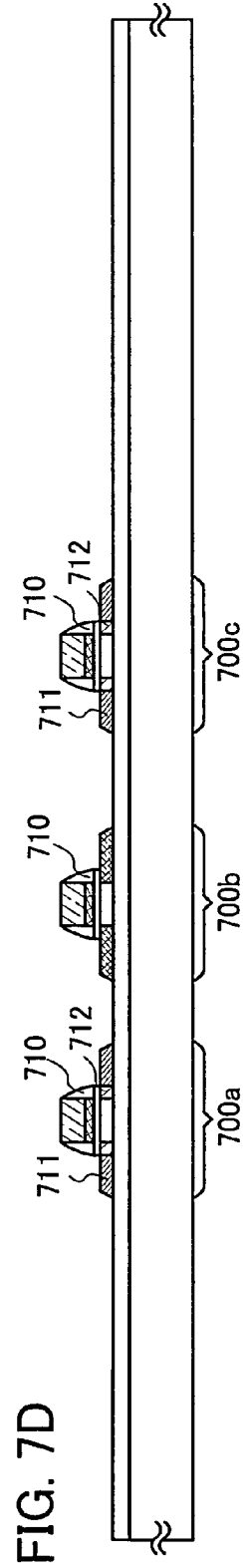

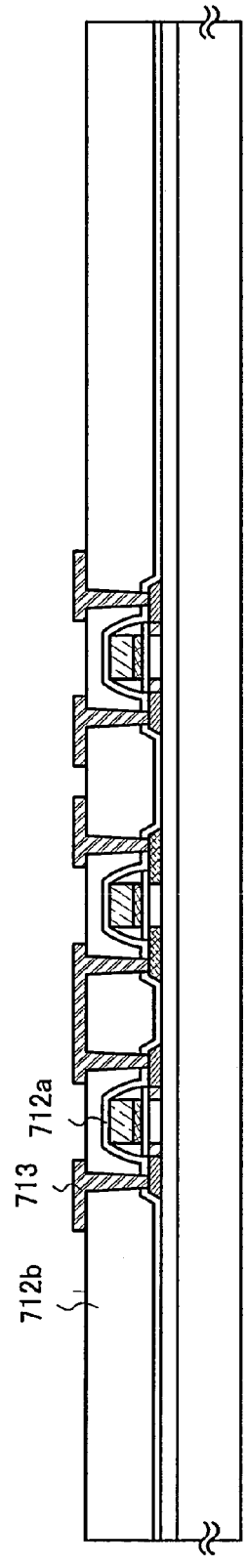
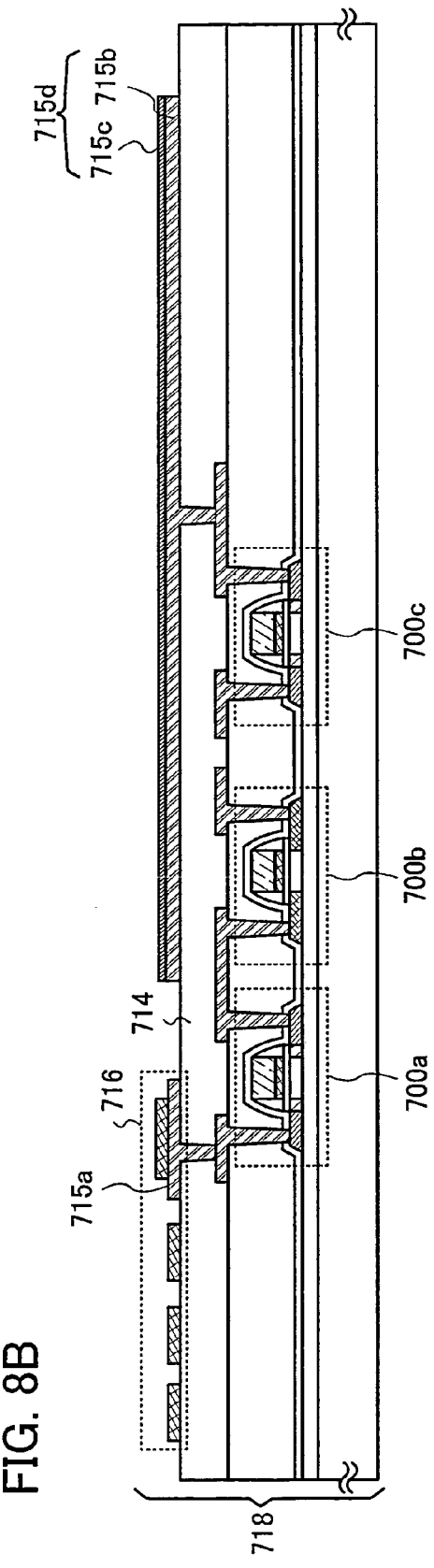

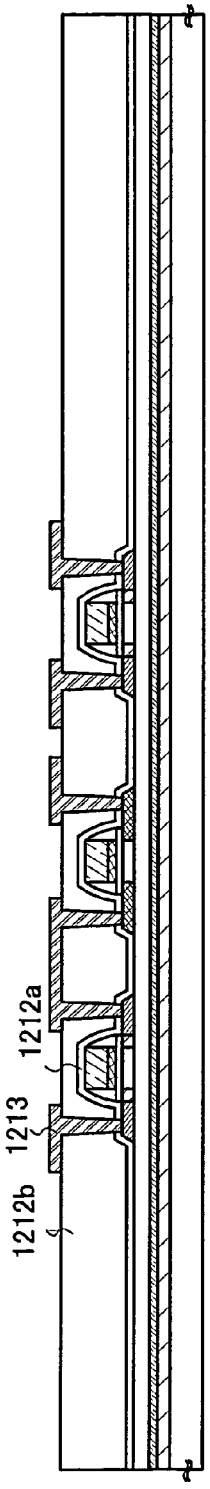
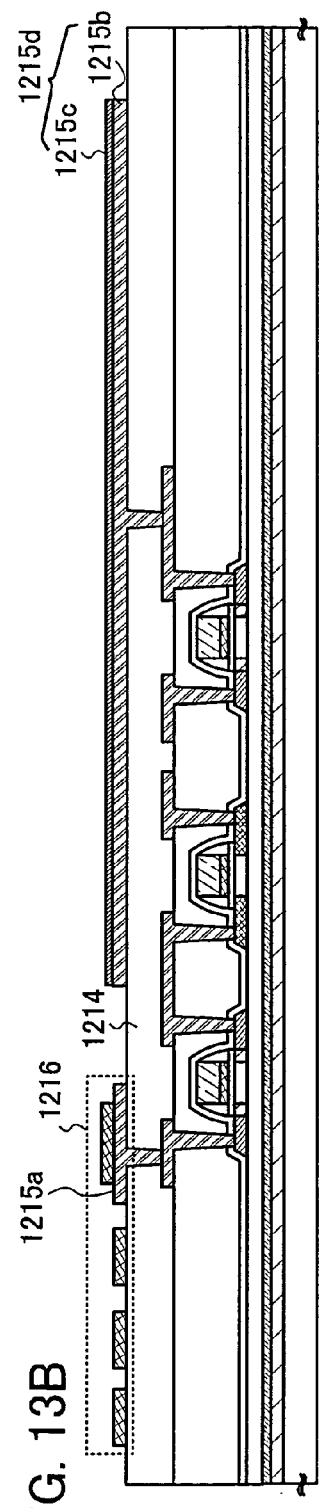
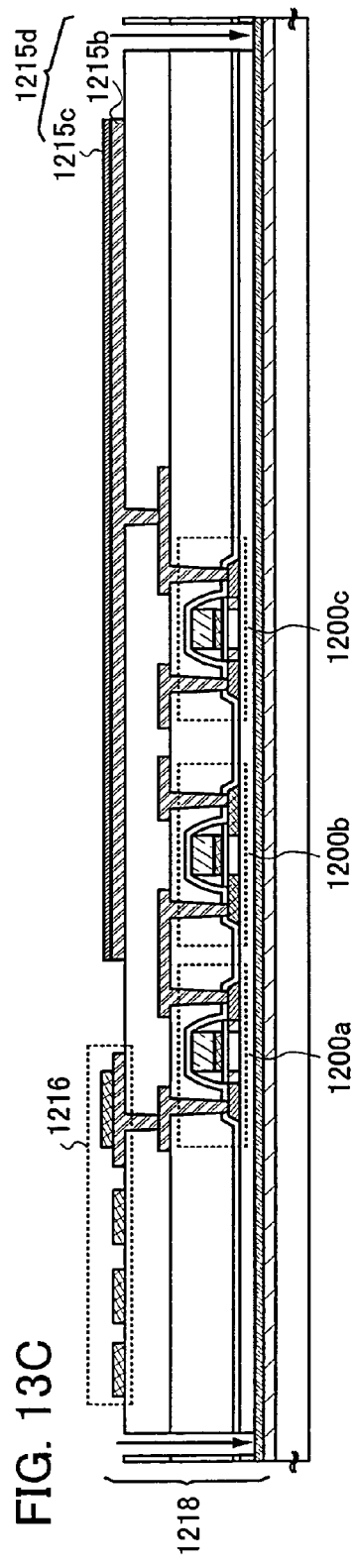
FIG. 13A
FIG. 13B
FIG. 13C

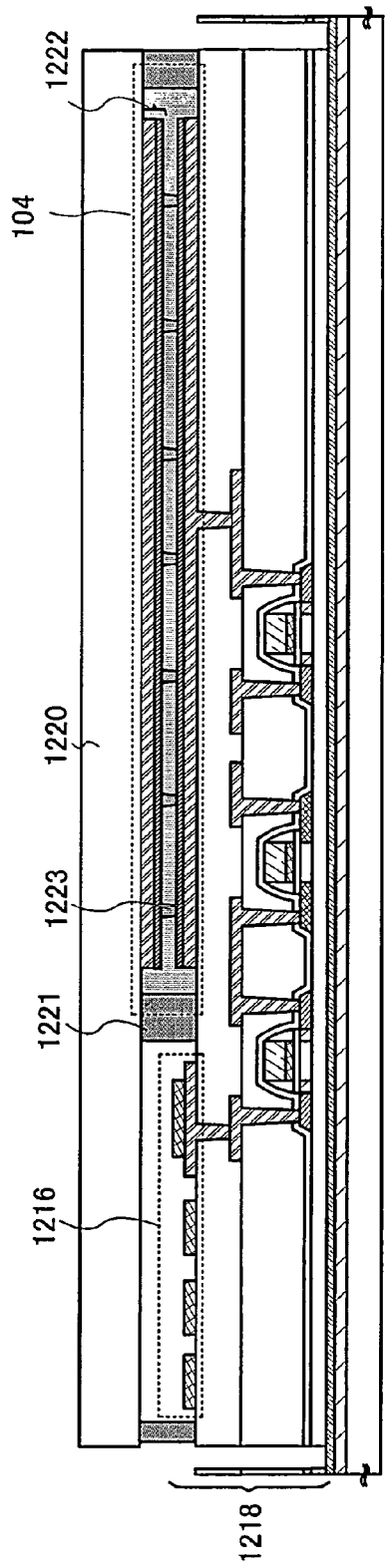
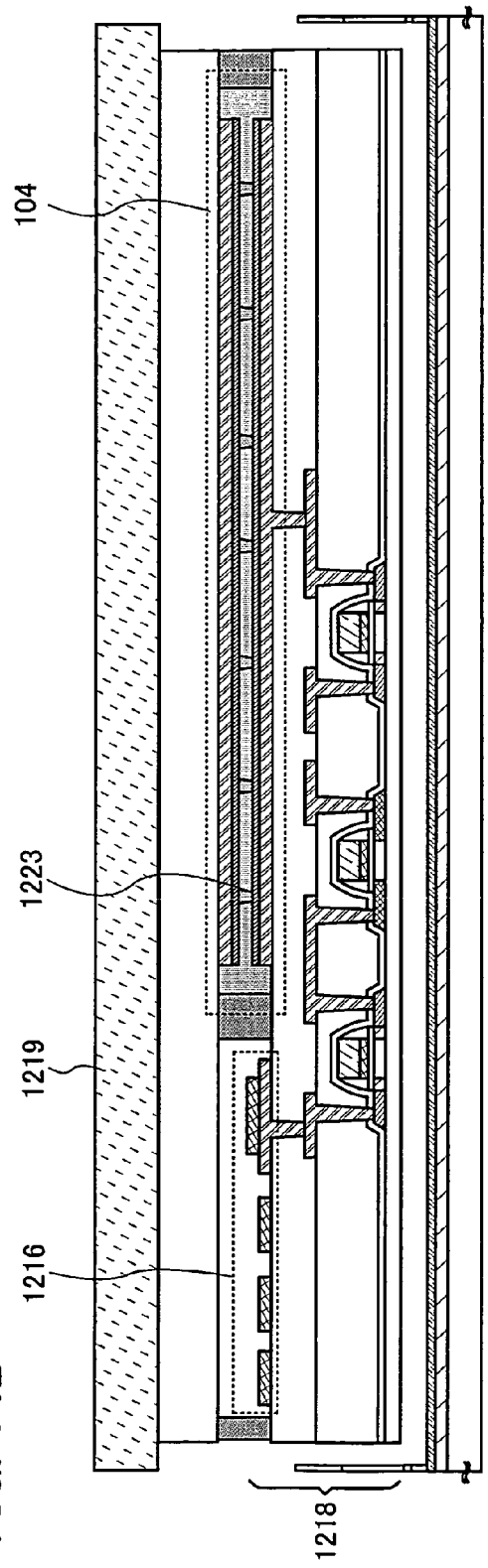
FIG. 14A
FIG. 14B

SEMICONDUCTOR DEVICE

BACKGROUND OF THE INVENTION

1. Field of the Invention

The present invention relates to a semiconductor device. In particular, the invention relates to a semiconductor device in which an antenna circuit, an electric double layer capacitor, and a signal processing circuit including a charging circuit are formed over a substrate.

2. Description of the Related Art

In recent years, RFID (radio frequency identification) tags have been attracting attention as a semiconductor device that communicates information by radio. The RFID tags (hereinafter, simply referred to as RFID) are also referred to as IC (integrated circuit) tags, IC chips, RF tags, wireless tags, or electronic tags. RFID has been utilized for production, management, and the like of individual objects, and has been expected to be applied to personal identification as well.

RFID can be classified into active-type RFID and passive-type RFID depending on whether a power source is incorporated in the RFID or a power source is supplied from the outside (as for the active-type RFID, see Reference 1: Japanese Published Patent Application No. 2005-316724 and, as for the passive-type RFID, see Reference 2: Japanese Translation of PCT International Application No. 2006-503376). The active-type RFID has a built-in battery as a power source for driving the RFID, whereas the passive-type RFID utilizes electricity, which is generated from radio waves or electromagnetic waves (carrier waves) from the outside, as a power source for driving the RFID so that a structure without a battery is realized.

FIG. 25 is a block diagram illustrating a specific structure of an active-type RFID. In an active-type RFID 3100 of FIG. 25, a communication signal received by an antenna circuit 3101 is input to a demodulation circuit 3105 and an amplifier 3106 in a signal processing circuit 3102. Communication signals are usually transmitted after processing of 13.56 MHz carriers or 915 MHz carriers through ASK modulation, PSK modulation, or the like. FIG. 25 illustrates an example in which 13.56 MHz carriers are used for the communication signals. In FIG. 25, a clock signal that is a reference for processing a signal is necessary, and a 13.56 MHz carrier is used as a clock here. The amplifier 3106 amplifies the 13.56 MHz carrier and supplies it to a logic circuit 3107 as the clock. In addition, the ASK modulated communication signal or the PSK modulated communication signal is demodulated by the demodulation circuit 3105. The demodulated signal is also transmitted to and analyzed by the logic circuit 3107. The signal analyzed by the logic circuit 3107 is transmitted to a memory control circuit 3108. In response to the signal, the memory control circuit 3108 controls a memory circuit 3109, and data stored in the memory circuit 3109 is retrieved and transmitted to a logic circuit 3110. The signal is encoded by the logic circuit 3110 and then amplified by an amplifier 3111 so that a modulation circuit 3112 modulates the signal. A power source is supplied from a battery 3103 provided outside the signal processing circuit 3102 through a power source circuit 3104. The power source circuit 3104 supplies electricity to the amplifier 3106, the demodulation circuit 3105, the logic circuit 3107, the memory control circuit 3108, the memory circuit 3109, the logic circuit 3110, the amplifier 3111, the modulation circuit 3112, and the like. In such a manner, the active-type RFID operates.

However, since the active-type RFID has the built-in battery 3103, the active-type RFID becomes inactive once the battery has run out. Therefore, it is necessary to control the lifetime of the battery or replace the battery after the battery has run out. However, a case is possible in which the battery cannot be replaced immediately after the operation of the RFID tag has stopped, depending on the circumstance in use.

In addition, when the built-in battery of the active-type RFID has run out of electric energy, the active-type RFID becomes unresponsive to signals from a reader. In that case, it is difficult for users to easily determine the reason why the RFID is unresponsive, that is, whether the battery has run out or there may be other reasons such as a bad reception state of radio waves or some problems with the reader.

FIG. 26 is a block diagram illustrating a specific structure of a passive-type RFID. In a passive-type RFID 3200 of FIG. 26, a communication signal received by an antenna circuit 3201 is input to a demodulation circuit 3205 and an amplifier 3206 in a signal processing circuit 3202. Communication signals are usually transmitted after processing of 13.56 MHz carriers or 915 MHz carriers through ASK modulation, PSK modulation, or the like. In FIG. 26, a clock signal that is a reference for processing a signal is necessary, and a 13.56 MHz carrier is used as the clock here. The amplifier 3206 amplifies the 13.56 MHz carrier and supplies it to a logic circuit 3207 as the clock. In addition, the ASK modulated communication signal or the PSK modulated communication signal is demodulated by the demodulation circuit 3205. The demodulated signal is also transmitted to and analyzed by the logic circuit 3207. The signal analyzed by the logic circuit 3207 is transmitted to a memory control circuit 3208. In response to the signal, the memory control circuit 3208 controls a memory circuit 3209, and data stored in the memory circuit 3209 is retrieved and transmitted to a logic circuit 3210. The signal is encoded by the logic circuit 3210 and then amplified by an amplifier 3211 so that a modulation circuit 3212 modulates the signal. On the other hand, the communication signal input to a rectifier circuit 3203 is rectified and input to a power source circuit 3204. The power source circuit 3204 supplies electricity to the amplifier 3206, the demodulation circuit 3205, the logic circuit 3207, the memory control circuit 3208, the memory circuit 3209, the logic circuit 3210, the amplifier 3211, the modulation circuit 3212, and the like. In such a manner, the passive-type RFID operates.

However, the passive-type RFID has a problem in that it is active only when located within the range that the RFID can receive radio waves or electromagnetic waves (carrier waves) from a reader/writer that is a transmission source of electricity. That is, the passive-type RFID is active only in the vicinity of a reader/writer.

In order to solve the aforementioned problems, there is known a method of providing a battery as a power source for supplying electricity to the RFID. Accordingly, the RFID can be used even when it is not receiving radio waves or electromagnetic waves (carrier waves) from the outside. In distribution systems and the like, in particular, an electric double layer capacitor that is compact and has high capacity is generally mounted as a battery on the RFID.

However, even when such a compact electric double layer capacitor is mounted on the RFID, the RFID itself becomes large or thick, although the RFID is desirably thin and lightweight.

In addition, when an anisotropic conductive film, in which conductive spacers are dispersed in a thermosetting resin or a photo-curing resin, is used for mounting the electric double layer capacitor on the RFID, reliability of the connection portion becomes low when the RFID is subjected to high-temperature conditions because the thermal expansion rates and the thermal contraction rates of the electric double layer capacitor and the RFID differ from one another.

In order to solve the foregoing problems, there is known a method of integrating an electric double layer capacitor into an RFID, for example by forming an electric double layer capacitor to be adjacent to a signal processing circuit that is constructed from CMOS (see Reference 3: Japanese Published Patent Application No. 2006-024087).

SUMMARY OF THE INVENTION

However, in the case of providing an electric double layer capacitor to be adjacent to a signal processing circuit, it is necessary to lead a wiring for connection of the electric double layer capacitor and the signal processing circuit. In distribution systems and the like, the RFID is often attached to an object with a curved surface. Therefore, stress is exerted on the RFID when it is bent. Hereinafter, stress exerted on an RFID when it is bent will be referred to as "bending stress". In particular, concerning an RFID formed with a flexible substrate, bending stress, which is exerted on a wiring for connection of an electric double layer capacitor and a signal processing circuit, is large. This could result in breaking of the wiring.

In view of the foregoing problems, it is an object of the invention to provide a semiconductor device typified by an RFID which is resistant to bending stress and has a structure in which an antenna circuit, an electric double layer capacitor for storing electricity, and the like are formed over a signal processing circuit that is provided over a substrate and has a charging circuit.

In order to solve the aforementioned problems, according to the invention, a signal processing circuit having a charging circuit is provided over a substrate, and an antenna circuit, an electric double layer capacitor for storing electricity, and the like are formed over the signal processing circuit. In addition, according to the invention, a wiring for connecting the charging circuit and the electric double layer capacitor can be made short. Specifically, in order to prevent breaking of the wiring between the electric double layer capacitor for storing electricity and the signal processing circuit having the charging circuit due to bending stress, the signal processing circuit having the charging circuit is formed over a substrate and the electric double layer capacitor for storing electricity is provided thereover. Accordingly, a semiconductor device that is more compact than the semiconductor device, in which the electric double layer capacitor for storing electricity is provided to be adjacent to the signal processing circuit, can be fabricated. Hereinafter, specific structures of the invention will be described.

A semiconductor device according to one aspect of the invention includes a signal processing circuit having a charging circuit, and an antenna circuit and an electric double layer capacitor that are provided over the signal processing circuit. The antenna circuit is electrically connected to the signal processing circuit, and the electric double layer capacitor is electrically connected to the charging circuit.

A semiconductor device according to one aspect of the invention includes a signal processing circuit provided over a first substrate and having a charging circuit, an antenna circuit and an electric double layer capacitor that are provided over the signal processing circuit, and a second substrate provided over the antenna circuit and the electric double layer capacitor. The antenna circuit is electrically connected to the signal processing circuit, and the electric double layer capacitor is electrically connected to the charging circuit.

A semiconductor device according to one aspect of the invention includes a signal processing circuit having a charging circuit, an insulating film provided over the signal processing circuit, and an antenna circuit and an electric double layer capacitor that are provided over the insulating film. The antenna circuit is electrically connected to the signal processing circuit through the insulating film, and the electric double layer capacitor is electrically connected to the charging circuit through the insulating film.

According to the semiconductor device of the invention with the aforementioned structure, the electric double layer capacitor includes at least a first electrode, a second electrode, and an electrolyte solution layer provided between the first electrode and the second electrode, and the first electrode is electrically connected to the charging circuit.

According to the semiconductor device of the invention with the aforementioned structure, a layer made of activated carbon, fullerene, or carbon nanotube is provided on at least one of the first electrode and the second electrode so that the layer is positioned between the electrode and the electrolyte solution layer.

According to the semiconductor device of the invention with the aforementioned structure, at least one of the first electrode and the second electrode is formed from activated carbon, fullerene, or carbon nanotube.

According to the semiconductor device of the invention with the aforementioned structure, the electrolyte solution layer of the electric double layer capacitor may include a separator.

According to the semiconductor device of the invention with the aforementioned structure, the electrolyte solution layer may include a cross-linking agent.

According to the semiconductor device of the invention with the aforementioned structure, the signal processing circuit includes a transistor.

According to the semiconductor device of the invention with the aforementioned structure, the substrate may be a flexible substrate.

According to the semiconductor device of the invention with the aforementioned structure, the electric double layer capacitor is positioned to overlap with the charging circuit.

According to the invention, a semiconductor device, in which an electric double layer capacitor for storing electricity is formed over the same substrate as an antenna circuit, a signal processing circuit, and the like, can be easily obtained. In this manner, by providing the electric double layer capacitor over the signal processing circuit having the charging circuit, a wiring for connecting the charging circuit and the electric double layer capacitor can be made short. Further, since the wiring can be made short, a semiconductor device, which includes an electric double layer capacitor for storing electricity that would not be broken by bending stress, can be provided. Note that the invention can be applied to not only RFID but also other electronic appliances that are thin and lightweight and are charged by radio.

BRIEF DESCRIPTION OF THE DRAWINGS

In the accompanying drawings:

FIGS. 7A to 7D illustrate an exemplary method of fabricating a semiconductor device of the invention;

FIGS. 8A and 8B illustrate an exemplary method of fabricating a semiconductor device of the invention;

FIGS. 13A to 13C illustrate an exemplary method of fabricating a semiconductor device of the invention;

FIGS. 14A and 14B illustrate an exemplary method of fabricating a semiconductor device of the invention;

DETAILED DESCRIPTION OF THE INVENTION

[Embodiment Mode]

Hereinafter, an embodiment mode and embodiments of the invention will be described with reference to the accompanying drawings. Note that the invention can be implemented in various different ways and it will be easily understood by those skilled in the art that various changes and modifications can be made in the invention without departing from the spirit and scope thereof. Therefore, the invention should not be construed as being limited to the description in the following embodiment mode and embodiments. In the structure of the invention described below, like numerals denote corresponding features consistently throughout the attached drawings.

A semiconductor device used for an RFID of the invention will be described with reference to a perspective view of FIG. 1A, a cross-sectional view of FIG. 1B, and a block diagram of FIG. 2. Note that the cross-sectional view of FIG. 1B corresponds to a cross section along line X-Y of FIG. 1A.

Note that "semiconductor devices" as referred to in this specification include all devices that can function by utilizing semiconductor characteristics. In addition, in this specification, an "electrode" is part of a "wiring". Although the terms "wiring" and "electrode" are selectively used for convenience of description, the term "wiring" can always be regarded as synonymous with the term "electrode". Further, in this specification, the term "connection" or "to connect" can always be regarded as synonymous with "electrical connection" or "to electrically connect".

Figure 1A:
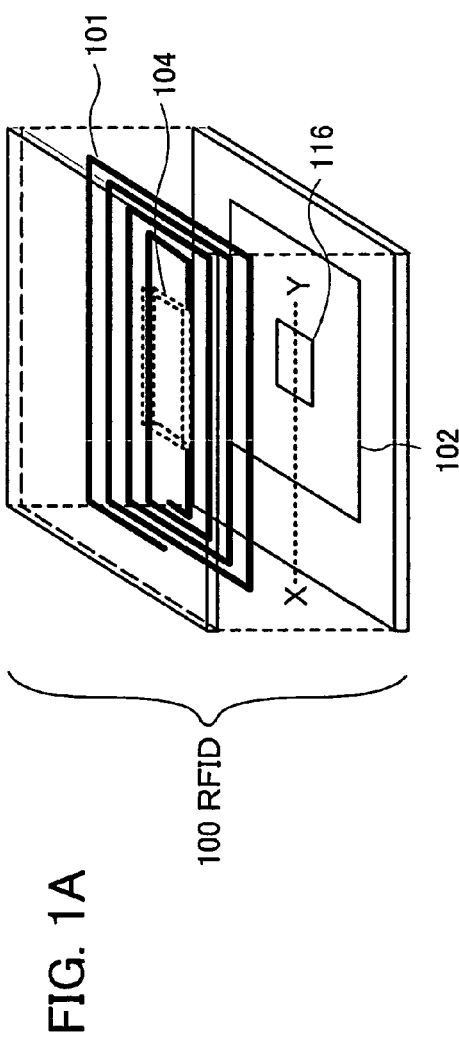
FIGS. 1A and 1B illustrate exemplary structures of a semiconductor device of the invention.
Figure 1B:
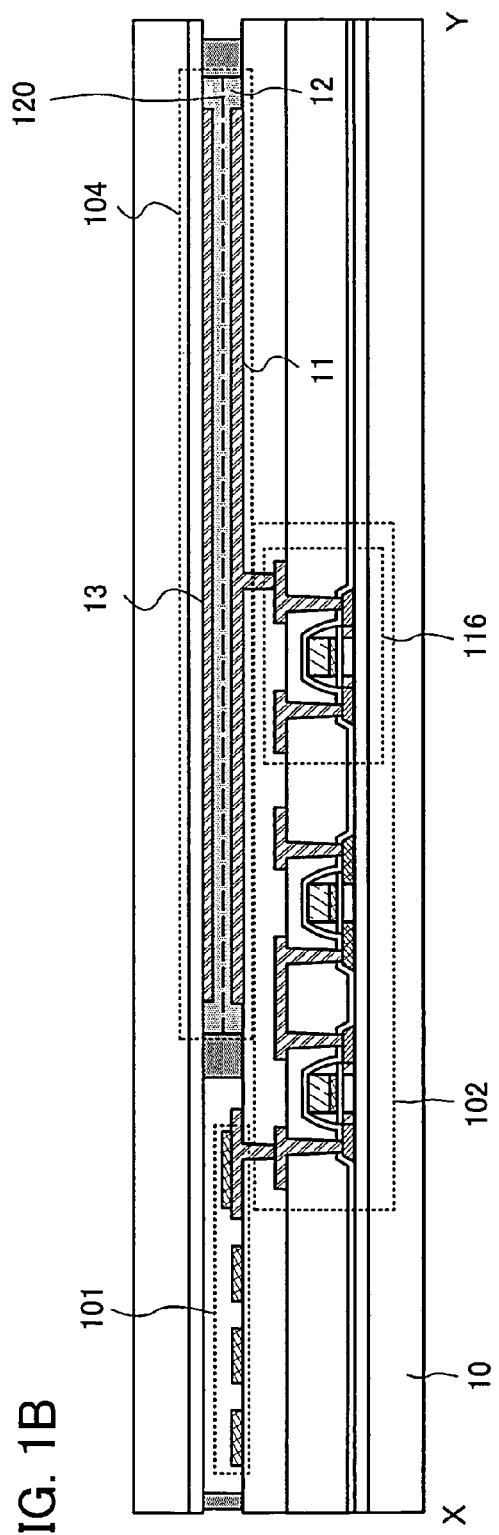

An RFID 100 includes an antenna circuit 101, a signal processing circuit 102 having a charging circuit 116, and an electric double layer capacitor 104 having a separator 120 (FIGS. 1A and 1B). The signal processing circuit 102 includes a rectifier circuit 105, a charging circuit 116 having a regulator, a discharging circuit 117, a demodulation circuit 108, an amplifier 109, a logic circuit 110, a memory control circuit 111, a memory circuit 112, a logic circuit 113, an amplifier 114, and a modulation circuit 115 (FIG. 2).

Figure 3A:
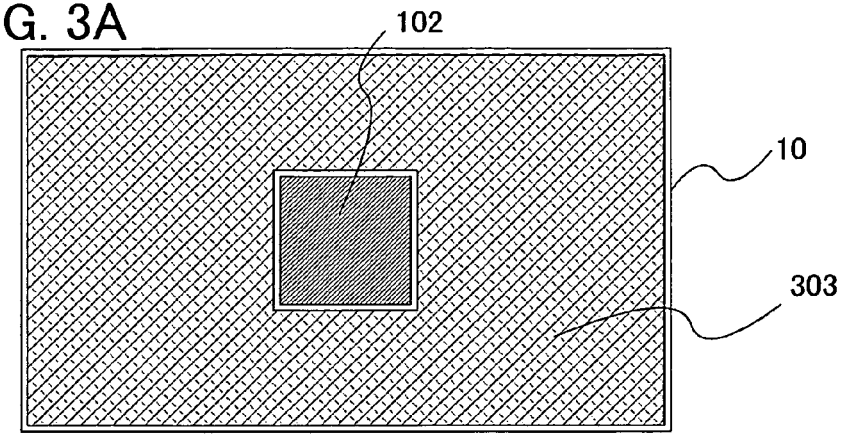
FIGS. 3A to 3E illustrate exemplary structures of an antenna included in a semiconductor device of the invention.
Figure 3B:
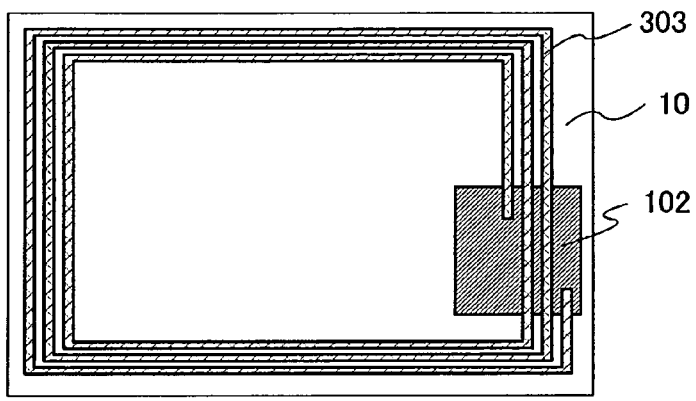
Figure 3C:
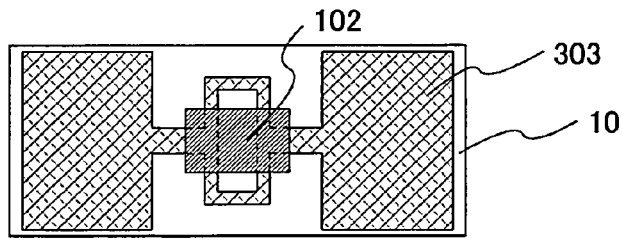
Figure 3D:
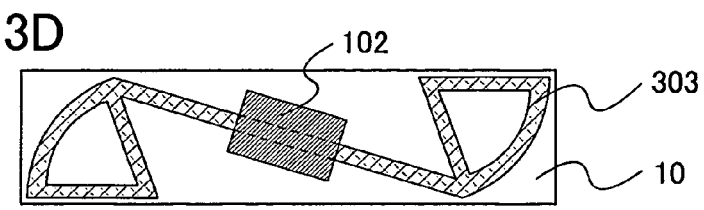
Figure 3E:
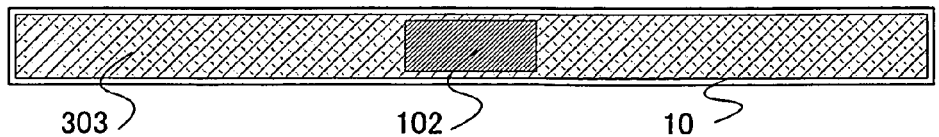
Figure 4A:
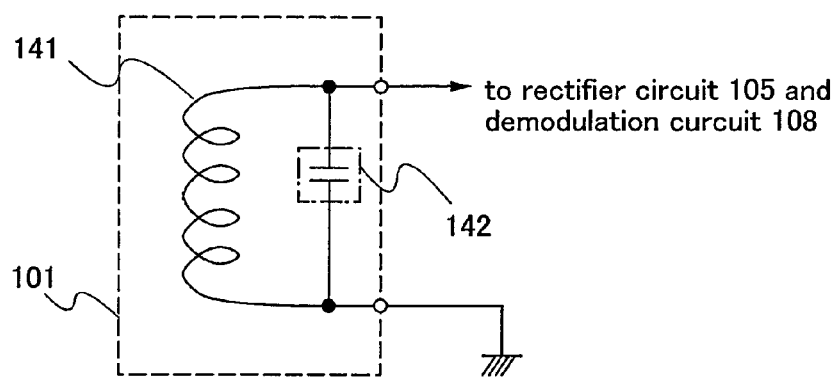
FIGS. 4A and 4B illustrate a semiconductor device of the invention.

Note that the shape of an antenna in the antenna circuit 101 is not specifically limited. For example, a layout may be used in which an antenna 303 is disposed all around the signal processing circuit 102 over a substrate 10 (FIG. 3A). In addition, a layout may be used in which the antenna 303 in a coil form is connected to the signal processing circuit 102 over the substrate 10 (FIG. 3B). Further, a layout may be used in which the signal processing circuit 102 and the antenna 303 having a form suited to receiving high-frequency electromagnetic waves are disposed over the substrate 10 (FIG. 3C). Alternatively, a layout may be used in which the signal processing circuit 102 and the antenna 303 which is 180-degree omnidirectional such that it can receive signals equally from any direction are disposed over the substrate 10 (FIG. 3D). As a further alternative, a layout may be used in which the signal processing circuit 102 and the antenna 303 with a long rod shape are disposed over the substrate 10 (FIG. 3E). The length required for the antenna differs depending on the frequency used for reception. For example, when a frequency of 2.45 GHz is used, in the case of providing a half-wave dipole antenna, the length of the antenna may be about 60 mm (a half wavelength), and in the case of providing a monopole antenna, the length may be about 30 mm (a quarter wavelength). Note that the antenna circuit 101 in this embodiment mode includes an antenna 141 and a resonant capacitor 142 and, thus, a set of the antenna 141 and the resonant capacitor 142 is referred to as the antenna circuit 101 (FIG. 4A).

Figure 4B:
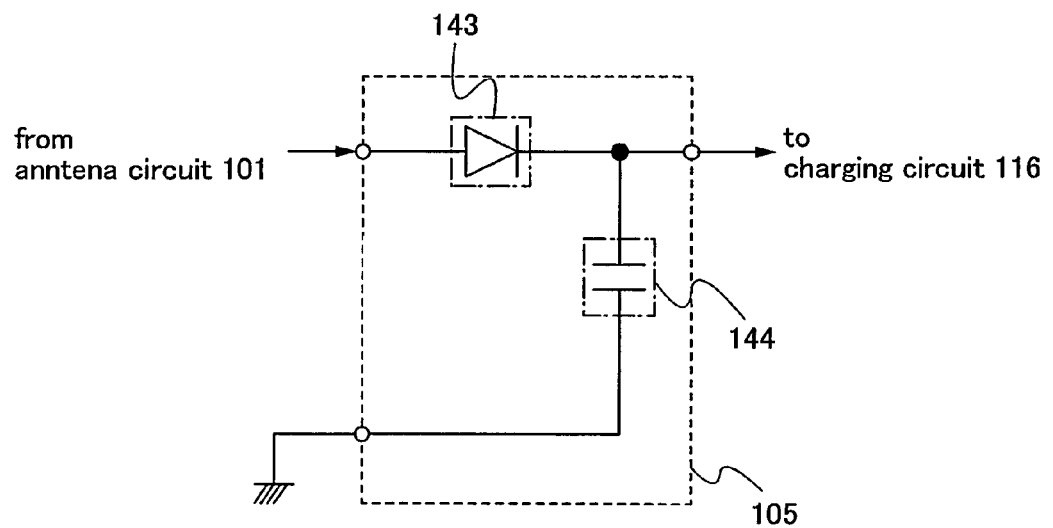

The rectifier circuit 105 may be any circuit as long as it can convert AC (alternating current) signals, which have been induced by electromagnetic waves received by the antenna circuit 101, into DC (direct current) signals. For example, the rectifier circuit 105 may be constructed from a diode 143 having a rectification property and a smoothing capacitor 144 (FIG. 4B).

Figure 5A:
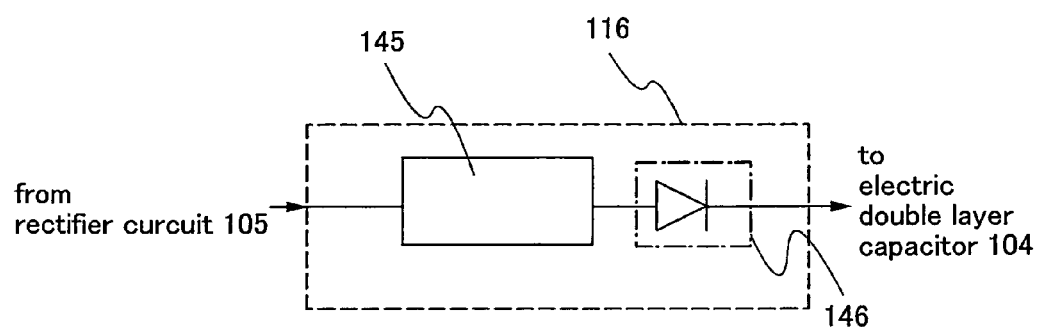
FIGS. 5A and 5B illustrate a semiconductor device of the invention.
Figure 5B:
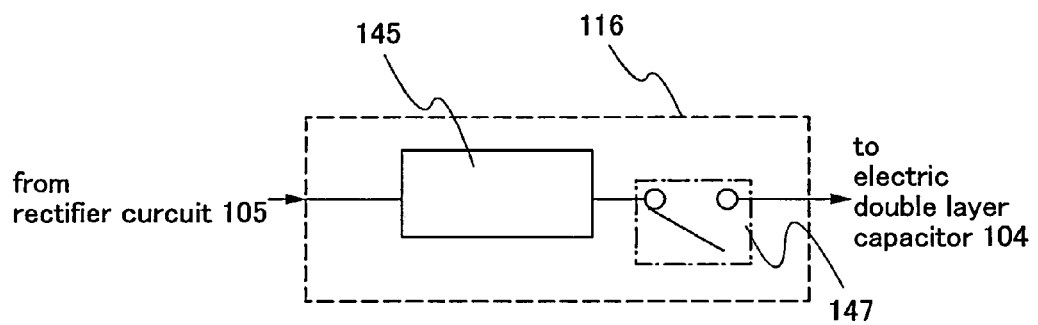

The charging circuit 116 may be any circuit as long as it can control the voltage level of an electric signal input from the rectifier circuit 105 and output the signal to the electric double layer capacitor 104. For example, the charging circuit 116 may be constructed from a regulator 145 that is a circuit for controlling voltage and a diode 146 having a rectification property (FIG. 5A). The diode 146 prevents leakage of electricity stored in the electric double layer capacitor 104. Therefore, the diode 146 may be replaced with a switch 147 as illustrated in FIG. 5B. In the case of providing the switch 147, leakage of electricity stored in the electric double layer capacitor 104 can be prevented by keeping the switch 147 on while the electric double layer capacitor 104 is being charged and by keeping the switch 147 off while the electric double layer capacitor 104 is not being charged.

Figure 2:
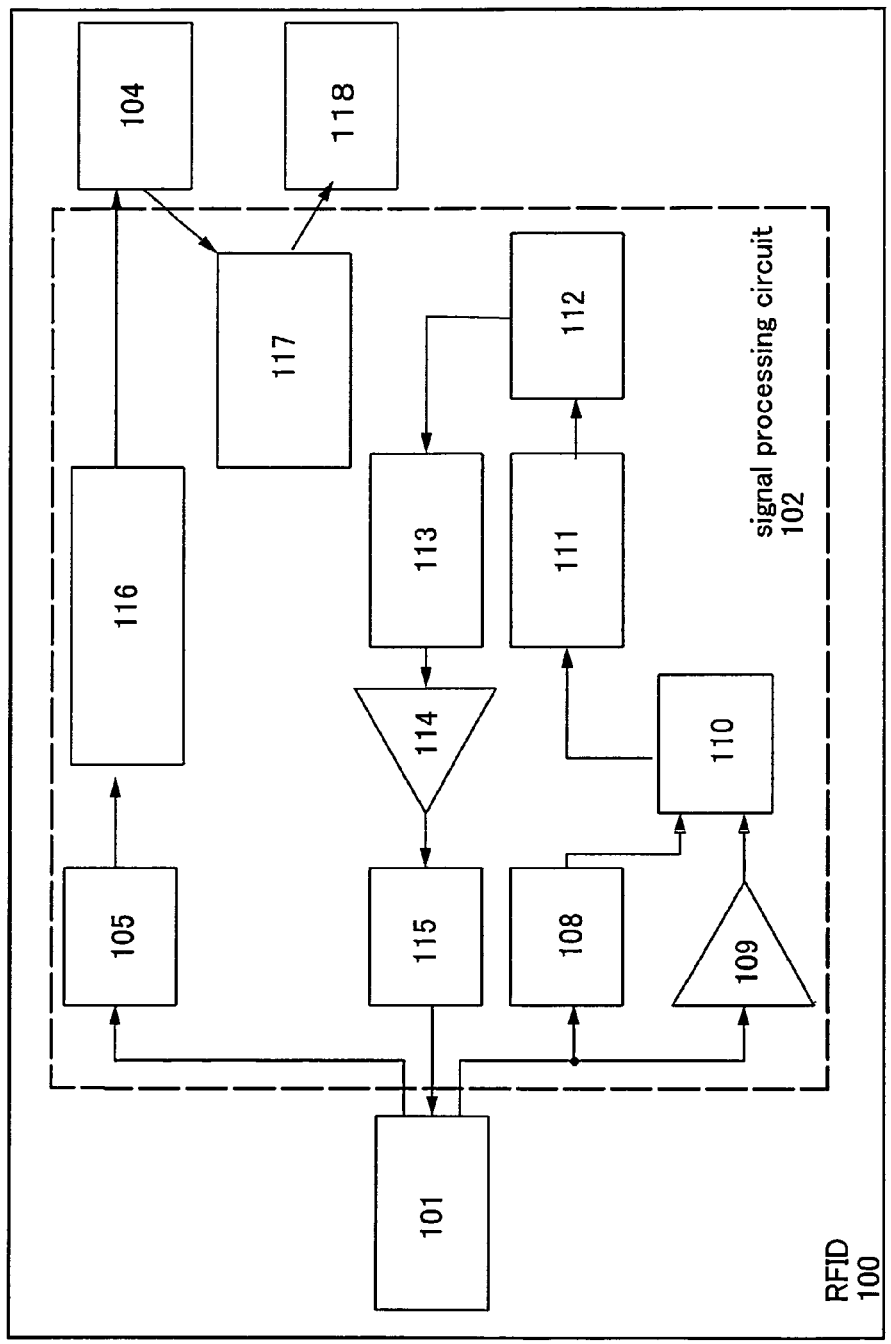
FIG. 2 illustrates an exemplary structure of a semiconductor device of the invention.

A power supply voltage whose voltage level has been controlled by the charging circuit 116 is input to and stored in the electric double layer capacitor 104 (FIG. 2). Electricity stored in the electric double layer capacitor 104 is supplied to a load portion 118 through the discharging circuit 117. That is, the electric double layer capacitor 104 is discharged.

Figure 6A:
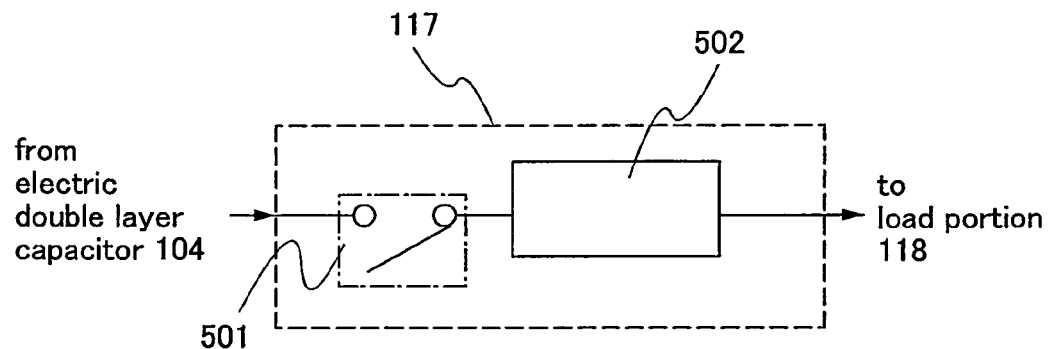
FIGS. 6A and 6B illustrate charging and discharging operations of a semiconductor device of the invention.

The discharging circuit 117 may be any circuit as long as it can control the discharging operation of the electric double layer capacitor 104 by controlling the level of a voltage output from the electric double layer capacitor 104. For example, the discharging circuit 117 may be constructed from a switch 501 and a regulator 502 that is a circuit for controlling voltage (FIG. 6A). By controlling on/off of the switch 501, supply of electricity to the load portion 118 from the electric double layer capacitor 104 can be controlled.

Figure 6B:
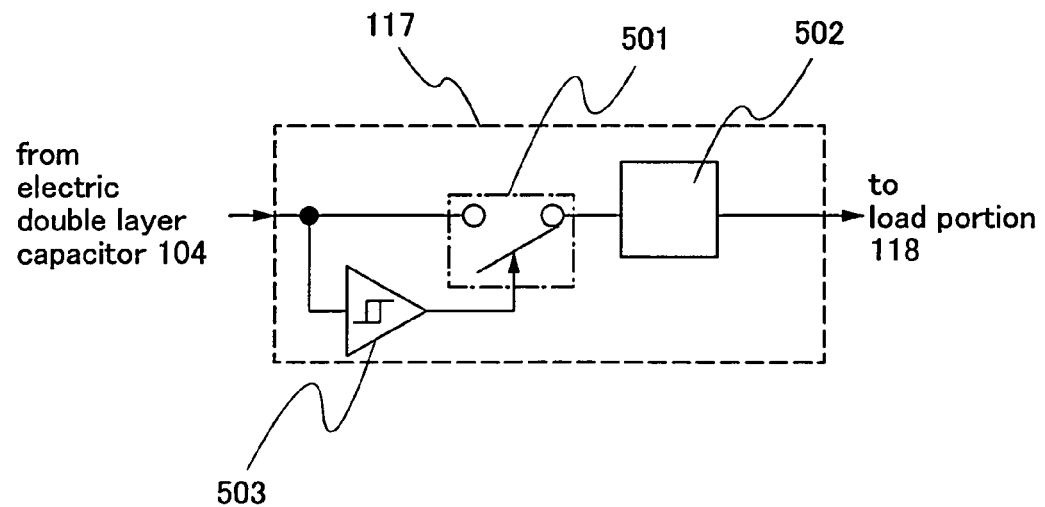

In addition, on/off of the switch 501 may be controlled in accordance with the voltage level of the electric double layer capacitor 104. For example, the structure illustrated in FIG. 6A may be combined with a Schmidt trigger 503 (FIG. 6B). With the Schmidt trigger 503, the switch element can have a hysteresis property. Specifically, the switch element can have two threshold levels, that is, the upper limit and the lower limit, with respect to the input voltage. Thus, on/off of the switch element can be controlled depending on whether the input voltage is higher or lower than the threshold levels. For example, when the voltage level of the electric double layer capacitor 104 is greater than or equal to 5 V, the switch 501 can be turned on, whereas when the voltage level is less than or equal to 3 V, the switch 501 can be turned off. That is, the load portion 118 can be supplied with electricity only when a given amount of electricity is stored in the electric double layer capacitor 104.

Next, the electric double layer capacitor 104 for storing electricity, which is formed over the same substrate as the antenna circuit 101 and the signal processing circuit 102 of the RFID 100, will be described.

In this embodiment mode, the signal processing circuit 102 including the charging circuit 116 is formed over the substrate 10, and the electric double layer capacitor 104 is formed thereover (FIG. 1B). A first electrode 11 of the electric double layer capacitor 104 is electrically connected to a transistor of the charging circuit 116. In addition, an electrolyte solution layer 12 and a second electrode 13 are sequentially provided over the first electrode 11. That is, the electric double layer capacitor 104 is constructed from at least the first electrode 11, the electrolyte solution layer 12, and the second electrode 13.

In charging the electric double layer capacitor 104, ions in the electrolyte solution are adsorbed to the electrode surface, and in discharging the electric double layer capacitor 104, the ions are desorbed from the electrode surface. In such a manner, ions in the electrolyte solution are adsorbed to or desorbed from the electrode surface during discharging or charging operation of the electric double layer capacitor 104. Therefore, unlike secondary batteries that utilize electrochemical reaction, the electric double layer capacitor will hardly degrade even after it is charged and discharged repeatedly. Thus, the electric double layer capacitor suffers extremely little performance degradation in comparison with secondary batteries. Moreover, the electric double layer capacitor can be used in a wide temperature range. Further, since the electric double layer capacitor 104 is charged or discharged by adsorption or desorption of ions in the electrolyte solution to/from the electrode surface, heat is not generated. Therefore, even when the electric double layer capacitor 104 is formed over the signal processing circuit 102 including the charging circuit 116, adverse effects of heat on transistors included in the charging circuit 116 or transistors included in the signal processing circuit 102 can be suppressed.

Note that each of the first electrode 11 and the second electrode 13 can be formed using a conductive film of either a singe layer or stacked layers, and formed by a chemical vapor deposition (CVD) method, a sputtering method, or the like, using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or compound material containing such an element as a main component.

The electrolyte solution layer 12 of the electric double layer capacitor 104 includes an electrolyte solution containing a solvent and an electrolyte. For the electrolyte, it is preferable to use a substance having properties such as high degree of dissociation in the solvent, high mobility of dissociated ions, and low susceptibility to side reactions such as decomposition of ion species due to oxidation-reduction reaction. For example, sulfuric acid, potassium hydroxide, or the like can be used for the electrolyte. For the solvent, it is preferable to use a substance having properties such as high a dielectric constant, high viscosity, and a large potential difference between the oxidation potential and the reduction potential. Note that solvents can be classified into aqueous solvents and nonaqueous solutions. A typical example of aqueous solvents is water. In comparison with nonaqueous solvents, aqueous solvents are advantageous in terms of cost of the electrolyte solution, safety, and high-speed charging. Meanwhile, typical examples of nonaqueous solvents are methanol, acetonitrile, propylene carbonate, and the like. In comparison with aqueous solvents, nonaqueous solvents are advantageous in high operating temperature range. Further, an ionic liquid may also be used as the electrolyte solution. In the invention, electrolyte solutions include an ionic liquid. Furthermore, a gel-like solid electrolyte solution, which does not degrade due to leakage of the solution and has a low decreasing rate of ionic conductivity, can be used as the electrolyte solution layer 12 of the electric double layer capacitor. The gel-like solid electrolyte solution contains a high molecular compound that is soluble in an electrolyte and water and exhibits a gel property to an acid substance or a base substance. In addition, such a gel-like solid electrolyte solution can be obtained by mixing a cross-linking agent or the like into the electrolyte solution layer 12 of the electric double layer capacitor 104 and applying thermal treatment or ultraviolet irradiation thereto. In this manner, by making the electrolytic solution layer 12 of the electric double layer capacitor 104 have a gel property, leakage of the electrolytic solution can be easily prevented.

Note that the capacity of the electric double layer capacitor 104 depends on the areas of the interface between the first electrode 11 and the electrolyte solution layer 12 and the interface between the second electrode 13 and the electrolyte solution layer 12. As the specific surface areas of the first electrode 11 and the second electrode 13 are larger, the capacity of the electric double layer capacitor 104 can be higher. Therefore, a layer that has a function of increasing the specific surface area of the electrode may be provided on each of the first electrode 11 and the second electrode 13. Such a layer can be formed by using activated carbon; nano-level carbon such as fullerene or a vertically aligned carbon nanotube; metal oxide; conductive high molecular compounds; or the like. For example, the layer is formed by applying iron, cobalt, nickel, copper, or the like that can function as a metal catalyst to the electrode by a spin coating method and depositing nano-level carbon such as a carbon nanotube thereon by an arc discharge method, a laser evaporation method, a laser ablation method, a chemical vapor deposition (CVD) method, or the like. The thus formed electrode with the layer can have low resistance and have a large specific surface area.

Further, it is also possible to replace each of the first electrode 11 and the second electrode 13 with the layer having a function of increasing the specific surface area, instead of using the aforementioned material for the electrodes.

The separator 120 has a function of preventing short between the first electrode 11 and the second electrode 13 of the electric double layer capacitor 104. Therefore, the separator 120 has a porous structure having holes that ions in the electrolyte solution can pass through. For example, the separator 120 can be formed using a porous polymer film with flexibility and mechanical strength, such as highly durable polyethylene or polypropylene.

As described above, by providing the electric double layer capacitor 104 over the charging circuit 116, an RFID that is thinner and lighter than an RFID, which has an electric double layer capacitor mounted on the RFID, can be provided. Further, by providing the electric double layer capacitor 104 over the signal processing circuit 102 having the charging circuit 116, a wiring for connecting the charging circuit 116 and the electric double layer capacitor 104 can be made short. Therefore, breaking of the wiring that could occur between the electric double layer capacitor 104 and the signal processing circuit 102 having the charging circuit 116 can be prevented.

Note that this embodiment mode can be combined as appropriate with any of embodiments in this specification.

[Embodiment 1]

This embodiment will describe a method of fabricating the RFID illustrated in the above embodiment mode.

First, an insulating film 704 serving as a base film and a semiconductor film 705 (for example, a film containing amorphous silicon) are sequentially stacked over one surface of a substrate 701 (FIG. 7A). Note that the insulating film 704 and the semiconductor film 705 can be formed consecutively.

The substrate 701 can be any of a glass substrate, a quartz substrate, a metal substrate (for example, a stainless steel substrate), a ceramic substrate, and a semiconductor substrate such as a Si substrate. Further, a plastic substrate made of polyethylene terephthalate (PET), polyethylene naphthalate (PEN), polyethersulfone (PES), or acrylic can also be used.

The insulating film 704 is formed by a chemical vapor deposition (CVD) method, a sputtering method, or the like using an insulating material such as silicon oxide, silicon nitride, silicon oxynitride ($SiO_xN_y$) (x>y>0), or silicon nitride oxide ($SiN_xO_y$) (x>y>0). For example, when the insulating film 704 is formed to have a two-layer structure, it is preferable to form a silicon nitride oxide film as a first insulating film and form a silicon oxynitride film as a second insulating film. Further, the insulating film 704 can also be formed by depositing a silicon nitride film as a first insulating film and depositing a silicon oxide film as a second insulating film. The insulating film 704 serves as a blocking layer that prevents diffusion of impurity elements from the substrate 701 into the semiconductor film 705. In this manner, the insulating film 704 serving as a blocking layer can prevent adverse effects of alkali metals such as Na or alkaline earth metals, which would otherwise be diffused from the substrate 701 into the semiconductor film 705. Note that the insulating film 704 may be omitted when quartz is used for the substrate 701, for example.

The semiconductor film 705 is formed to a thickness of 25 to 200 nm (preferably, 30 to 150 nm) by a sputtering method, an LPCVD method, a plasma CVD method, or the like.

Next, the semiconductor film 705 is irradiated with a laser beam to be crystallized (FIG. 7B). Note that the semiconductor film 705 may also be crystallized by combining laser irradiation with a thermal crystallization method that uses RTA or an annealing furnace or with a thermal crystallization method that uses a metal element for promoting crystallization. Then, the crystalline semiconductor film is patterned into a desired shape by etching, so that crystalline semiconductor films 705a to 705c are formed (FIG. 7B). Then, a gate insulating film 706 is formed to cover the crystalline semiconductor films 705a to 705c.

Note that the gate insulating film 706 is formed by a chemical vapor deposition (CVD) method, a sputtering method, or the like using an insulating material such as silicon oxide, silicon nitride, silicon oxynitride ($SiO_xN_y$) (x>y>0), or silicon nitride oxide ($SiN_xO_y$) (x>y>0). For example, when the gate insulating film 706 is formed to have a two-layer structure, it is preferable to form a silicon oxynitride film as a first insulating film and form a silicon nitride oxide film as a second insulating film. Further, the gate insulating film 706 can also be formed by depositing a silicon oxide film as a first insulating film and depositing a silicon nitride film as a second insulating film.

A fabrication process of the crystalline semiconductor films 705a to 705c will be briefly described below. First, an amorphous semiconductor film with a thickness of 50 to 60 nm is deposited by a plasma CVD method. Then, a solution containing nickel that is a metal element for promoting crystallization is applied to and retained on the amorphous semiconductor film. Then, the amorphous semiconductor film is subjected to dehydrogenation treatment (500° C. for one hour) and thermal crystallization treatment (550° C. for four hours), so that a crystalline semiconductor film is obtained. After that, the crystalline semiconductor film is patterned into crystalline semiconductor films 705a to 705c by a photolithography method using laser irradiation. Note that the amorphous semiconductor film may be crystallized by only laser irradiation without the thermal crystallization that uses a metal element for promoting crystallization.

As a laser oscillator used for crystallization, either a continuous-wave laser (CW laser) or a pulsed laser can be used. Laser beams that can be used here include beams emitted from one or more kinds of the following lasers: a gas laser such as an Ar laser, a Kr laser, or an excimer laser; a laser in which single-crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ is used as a medium and one or more of Nd, Yb, Cr, Ti, Ho, Er, Tm, and Ta is added thereto as a dopant; a glass laser; a ruby laser; an alexandrite laser; a Ti:sapphire laser; a copper vapor laser; and a gold vapor laser. Crystals with a large grain diameter can be obtained by irradiation with the fundamental wave of the above laser beam or the second harmonic to the fourth harmonic of the fundamental wave thereof. For example, the second harmonic (532 nm) or the third harmonic (355 nm) of a Nd:$YVO_4$ laser (the fundamental wave: 1064 nm) can be used. At this time, the power density of the laser needs to be about 0.01 to 100 MW/cm$^2$ (preferably, 0.1 to 10 MW/cm$^2$). A scanning rate is set to about 10 to 2000 cm/sec for irradiation. Note that the laser in which single-crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ is used as a medium and one or more of Nd, Yb, Cr, Ti, Ho, Er, Tm, and Ta is added thereto as a dopant; an Ar ion laser; or a Ti:sapphire laser can perform CW operation. Alternatively, it can also perform pulsed operation at a repetition rate of greater than or equal to 10 MHz by combining Q-switching operation, mode locking, or the like. When a laser beam is pulsed at a repetition rate of greater than or equal to 10 MHz, it is possible for a semiconductor film to be irradiated with the next pulse after it is melted by the previous laser beam and before it becomes solidified. Therefore, unlike the case of using a pulsed laser with a low repetition rate, a solid-liquid interface of the semiconductor film can be moved continuously. Thus, crystal grains that have grown continuously in the scanning direction can be obtained.

The gate insulating film 706 may also be formed by oxidizing or nitriding the surfaces of the semiconductor films 705a to 705c by high-density-plasma treatment. For example, the gate insulating film 706 is formed by plasma treatment with a mixed gas of a rare gas such as He, Ar, Kr, or Xe, and oxygen, nitrogen oxide ($NO_2$), ammonia, nitrogen, hydrogen, or the like. When plasma is excited by introduction of microwaves, plasma with a low electron temperature and high electron density can be generated. The surfaces of the semiconductor films can be oxidized or nitrided by oxygen radicals (there may also be OH radicals) or nitrogen radicals (there may also be NH radicals).

By such high-density-plasma treatment, an insulating film with a thickness of 1 to 20 nm, typically 5 to 10 nm is formed on the semiconductor films. Since the reaction in this case is a solid-phase reaction, interface state density between the insulating film and the semiconductor films can be extremely low. Such high-density-plasma treatment directly oxidizes (or nitrides) the surfaces of the semiconductor films (crystalline silicon or polycrystalline silicon). Therefore, variations in thickness of the insulating film to be formed can be ideally quite small. In addition, since the crystal grain boundaries of crystalline silicon are not strongly oxidized, an excellent state is obtained. That is, by solid-phase oxidizing the surfaces of the semiconductor films by high-density-plasma treatment as described here, an insulating film with a uniform thickness and low interface state density can be formed without local oxidation reaction at the crystal grain boundaries.

Note that the gate insulating film 706 may be formed using only an insulating film deposited by high-density-plasma treatment. Further, an insulating film such as silicon oxide, silicon oxynitride, or silicon nitride may be deposited thereon by a CVD method with plasma or thermal reaction. In any case, a transistor which includes an insulating film formed by high-density-plasma treatment in a part or the whole of its gate insulating film can have small variations in characteristics.

Furthermore, the semiconductor films 705a to 705c, which are obtained by crystallizing a semiconductor film by irradiation with a continuous-wave laser beam or with a laser beam pulsed at a repetition rate of greater than or equal to 10 MHz while scanning in one direction, have a characteristic in having crystals that have grown in the beam scanning direction. When transistors are arranged such that their channel length directions (directions in which carriers flow when channel formation regions are formed) are disposed in the same direction as the scanning direction, and combined with the aforementioned gate insulating layer, thin film transistors (TFTs) with small variations in characteristics and high electron field-effect mobility can be obtained.

Next, a first conductive film and a second conductive film are stacked over the gate insulating film 706. Here, the first conductive film is formed to a thickness of 20 to 100 nm by a chemical vapor deposition (CVD) method, a sputtering method, or the like. The second conductive film is formed to a thickness of 100 to 400 nm. Each of the first conductive film and the second conductive film is formed using an element selected from tantalum (Ta), tungsten (W), titanium (Ti), molybdenum (Mo), aluminum (Al), copper (Cu), chromium (Cr), niobium (Nb), or the like, or an alloy material or compound material containing such an element as a main component. Alternatively, a semiconductor material typified by polycrystalline silicon doped with an impurity element such as phosphorus may be used. Examples of the combination of the first conductive film and the second conductive film include a tantalum nitride film and a tungsten film; a tungsten nitride film and a tungsten film; and a molybdenum nitride film and a molybdenum film. Tungsten and tantalum nitride have high heat resistance. Therefore, when they are used for the first conductive film and the second conductive film, thermal treatment for thermal activation may be applied after the formation of the first conductive film and the second conductive film. In addition, when the gate insulating film 706 is formed to have not a two-layer structure but a three-layer structure, a stacked-layer structure of a molybdenum film, an aluminum film, and a molybdenum film is preferably used.

Next, resist masks are formed by a photolithography method, and etching treatment for forming gate electrodes and gate lines is applied, so that gate electrodes 707 are formed above the semiconductor films 705a to 705c. Illustrated here is an example in which each gate electrode 707 has a stacked-layer structure of a first conductive film 707a and a second conductive film 707b.

Next, the semiconductor films 705a to 705c are doped with an impurity element imparting n-type conductivity (hereinafter referred to as an n-type impurity element) with the gate electrodes 707 as masks, by an ion doping method or an ion implantation method so that the semiconductor films 705a to 705c contain the n-type impurity element at a low concentration (FIG. 7C). Then, resist masks are selectively formed by a photolithography method and the semiconductor film 705b is doped with an impurity element imparting p-type conductivity (hereinafter referred to as a p-type impurity element) so that the semiconductor film 705b contains the p-type impurity element at a high concentration. Examples of the n-type impurity element include phosphorus (P) and arsenic (As). Examples of the p-type impurity element include boron (B), aluminum (Al), and gallium (Ga). Here, phosphorus (P) is used as the n-type impurity element and selectively added to the semiconductor films 705a to 705c so that the semiconductor films 705a to 705c contain phosphorus at a concentration of $1 \times 10^{15}$ to $1 \times 10^{17}/cm^3$. Accordingly, n-type impurity regions 708 are formed. In addition, boron (B) is used as the p-type impurity element and selectively added to the semiconductor film 705b so that the semiconductor film 705b contains boron (B) at a concentration of $1 \times 10^{17}$ to $1 \times 10^{20}/cm^3$. Accordingly, p-type impurity regions 709 are formed.

Next, an insulating film is formed to cover the gate insulating film 706 and the gate electrodes 707. The insulating film is formed by depositing a film containing an inorganic material such as silicon, silicon oxide, or silicon nitride, or a film containing an organic material such as an organic resin by a plasma CVD method, a sputtering method, or the like, and has a single-layer structure or a stacked-layer structure. Then, the insulating film is selectively etched by anisotropic etching (etching mainly in a perpendicular direction), so that insulating films (also referred to as sidewalls) 710 that are in contact with the side surfaces of the gate electrodes 707 are formed. The insulating films 710 are used as doping masks for formation of LDD (lightly doped drain) regions.

Next, the semiconductor films 705a and 705c are doped with an n-type impurity element, using resist masks formed by a photolithography method, the gate electrodes 707, and the insulating films 710 as masks, so that the semiconductor films 705a and 705c contain the n-type impurity element at a high concentration. Accordingly, n-type impurity regions 711 are formed. Here, phosphorus (P) is used as the n-type impurity element and selectively added to the semiconductor films 705a and 705c so that the semiconductor films 705a and 705c contain phosphorus at a concentration of $1 \times 10^{17}$ to $1 \times 10^{20}/$ cm³. Accordingly, the n-type impurity regions 711 having a higher concentration of impurity than the impurity regions 708 are formed.

Through the above steps, n-channel thin film transistors 700a and 700c and a p-channel thin film transistor 700b are formed (FIG. 7D).

In the n-channel thin film transistor 700a, a channel formation region is formed in a region of the semiconductor film 705a which overlaps with the gate electrode 707; the impurity regions 711 that form source and drain regions are formed in regions which do not overlap with the gate electrode 707 or the insulating films 710; and lightly doped drain regions (LDD regions) 712 are formed in regions which overlap with the insulating films 710 and are located between the channel formation region and the impurity regions 711. Similarly, the channel formation region and the lightly doped drain regions 711 are also formed in the n-channel thin film transistor 700c.

In the p-channel thin film transistor 700b, a channel formation region is formed in a region of the semiconductor film 705b which overlaps with the gate electrode 707, and impurity regions 709 that form source and drain regions are formed in regions which do not overlap with the gate electrode 707. Although LDD regions are not provided in the p-channel thin film transistor 700b here, the LDD regions may be provided in the p-channel thin film transistor. Also, the LDD regions are not necessarily provided in the n-channel thin film transistors.

Next, an insulating film with a single layer or stacked layers is formed to cover the semiconductor films 705a to 705c, the gate electrodes 707, and the like (FIG. 8A). Then, conductive films 713 are formed over the insulating film to be electrically connected to the impurity regions and 709 and 711 that form the source and drain regions of the thin film transistors 700a to 700c. The insulating film is formed either in a single layer or stacked layers by a chemical vapor deposition (CVD) method, a sputtering method, an SOG method, a droplet discharge method, a screen printing method, or the like, using an inorganic material such as silicon oxide or silicon nitride; an organic material such as polyimide, polyamide, benzocyclobutene, acrylic, or epoxy; a siloxane material; or the like. Here, the insulating film is formed to have two layers. Specifically, a silicon nitride oxide film is formed as a first insulating film 712a and a silicon oxynitride film is formed as a second insulating film 712b. The conductive films 713 form the source and drain electrodes of the semiconductor films 705a to 705c.

Note that before the formation of the insulating films 712a and 712b, or after the formation of one or both of the insulating films 712a and 712b, thermal treatment is preferably applied in order to recover the crystallinity of the semiconductor films, activate the impurity elements added to the semiconductor films, or hydrogenate the semiconductor films. The thermal treatment is preferably performed by thermal annealing, laser annealing, RTA, or the like.

The conductive film 713 is formed either in a single layer or stacked layers by a chemical vapor deposition (CVD) method, a sputtering method, or the like, using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or compound material containing such an element as a main component. An alloy material containing aluminum as a main component is, for example, an alloy material which contains aluminum as a main component and contains nickel, or an alloy material which contains aluminum as a main component and contains one or both of carbon and silicon. The conductive film 713 preferably has a stacked-layer structure of, for example, a barrier film, an aluminum silicon (Al—Si) film, and a barrier film, or a stacked-layer structure of a barrier film, an aluminum silicon (Al—Si) film, a titanium nitride film, and a barrier film. Note that the barrier film corresponds to a thin film made of titanium, titanium nitride, molybdenum, or molybdenum nitride. Aluminum and aluminum silicon, which have low resistance values and are inexpensive, are the most suitable materials for forming the conductive film 713. When barrier layers are provided as the top layer and the bottom layer of the conductive film 713, generation of hillock of aluminum or aluminum silicon can be prevented. Further, when a barrier film made of titanium that is an element having a high reducing property is formed, even when there is a thin natural oxide film formed on the crystalline semiconductor film, the natural oxide film can be reduced, so that the conductive film 713 can form a favorable contact with the crystalline semiconductor film.

Next, an insulating film 714 is formed to cover the conductive films 713, and conductive films 715a and 715b are formed over the insulating film 714 to be electrically connected to the conductive films 713 that form the source or drain electrodes of the semiconductor films 705a and 705c. As illustrated in the embodiment mode, the conductive films 715a and 715b that are electrically connected to the conductive films 713 are formed either in a single layer or stacked layers by a chemical vapor deposition (CVD) method, a sputtering method, or the like, using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or compound material containing such an element as a main component. After that, iron, cobalt, nickel, copper, or the like that functions as a metal catalyst is formed over the conductive film 715b by a spin coating method. Then, nano-level carbon such as a carbon nanotube is grown by an arc discharge method, a laser evaporation method, a laser ablation method, or chemical vapor deposition (CVD) method, so that a layer 715c that has a function of increasing the specific surface area of an electrode is formed. Accordingly, a first electrode of an electric double layer capacitor that has low resistance and a large specific surface area is formed. Note that the conductive film 715b and the layer 715c function as a first electrode 715d of the electric double layer capacitor. The first electrode 715d may also be formed without using the conductive film 715b. In that case, the first electrode 715d may be formed using only the layer 715c that is made of activated carbon; nano-level carbon such as fullerene or a vertically aligned carbon nanotube; metal oxide; conductive high molecular compounds; or the like. For example, when the first electrode 715d is formed using activated carbon, the following method can be used: first, polytetrafluoroethylene that is a binder is added to and mixed with a mixture of activated carbon powder and acetylene black that is a conducting agent; then, the mixture is dried at reduced pressure and attached to the conductive film 713.

Note that the conducting agent may be not only acetylene black but also carbon black such as ketjenblack or metallic fibers such as natural graphite, thermally expanded graphite, carbon fibers, ruthenium oxide, titanium oxide, aluminum, or nickel. In the case of using acetylene black, conductivity can be effectively improved. Therefore, the weight percent of acetylene black is preferably 10 to 15 wt % of activated carbon.

Note also that the binder may be not only polytetrafluoroethylene but also polyvinylidene fluoride, carboxymethyl cellulose, fluoroolefin cross-linked copolymers, polyvinyl alcohol, polyacrylic acid, polyimide, phenol resin, or the like.

Next, a conductive film 716 that functions as an antenna is formed to be electrically connected to the conductive film 715a (FIG. 8B). Here, the conductive film 716 that functions as the antenna corresponds to the antenna 303 of the antenna circuit 101 illustrated in the embodiment mode.

Note that the insulating film 714 can be formed either in a single layer or stacked layers by a chemical vapor deposition (CVD) method, a sputtering method, or the like, using an insulating material containing oxygen or nitrogen, such as silicon oxide ($SiO_x$), silicon nitride ($SiN_x$), silicon oxynitride ($SiO_xN_y$) ($x>y>0$), or silicon nitride oxide ($SiN_xO_y$) ($x>y>0$); a film containing carbon such as DLC (diamond-like carbon); an organic material such as epoxy, polyimide, polyamide, polyvinyl phenol, benzocyclobutene, or acrylic; or a siloxane material such as a siloxane resin. Note that a siloxane material is a material having a Si—O—Si bond. Siloxane has a skeletal structure with the bond of silicon (Si) and oxygen (O). As a substituent of siloxane, an organic group containing at least hydrogen (e.g., an alkyl group or an aryl group) is used. A fluoro group may also be used as the substituent. Alternatively, both an organic group containing at least hydrogen and a fluoro group may be used as the substituent.

The conductive film 716 is formed by depositing a conducive material by a chemical vapor deposition (CVD) method, a sputtering method, a printing method such as screen printing or gravure printing, a droplet discharge method, a dispenser method, a plating method, or the like. The conductive material can be an element selected from aluminum (Al), titanium (Ti), silver (Ag), copper (Cu), gold (Au), platinum (Pt), nickel (Ni), palladium (Pd), tantalum (Ta), or molybdenum (Mo), or an alloy material or compound material containing such an element as a main component. The conductive film 716 may have either a single-layer structure or a stacked-layer structure.

When the conductive film 716 that functions as the antenna is formed by a screen printing method, for example, conductive paste, in which conductive particles with a grain diameter of several nanometers to several tens of nanometers are diffused or dispersed in an organic resin, may be selectively printed. For the conductive particles, metal particles including at least one type of metal such as silver (Ag), gold (Au), copper (Cu), nickel (Ni), platinum (Pt), palladium (Pd), tantalum (Ta), molybdenum (Mo), and titanium (Ti); fine particles of silver halide; or dispersant nanoparticles can be used. In addition, for an organic resin included in the conductive paste, one or more of resins functioning as a binder, a solvent, a dispersant, and a covering material for metal particles can be used. Typical examples of organic resins include an epoxy resin and a silicone resin. In addition, in forming the conductive film, baking is preferably performed after the conductive paste is pushed out. For example, in the case of using fine particles (for example, a grain diameter of greater than or equal to 1 nm and less than or equal to 100 nm) containing silver as a main component as a material for the conductive paste, the conductive film can be obtained by curing the conductive paste by baking at a temperature in the range of 150 to 300° C. In addition, fine particles containing solder or lead-free solder as a main component may be used, and in this case, fine particles with a grain diameter of less than or equal to 20 μm is preferably used. Solder and lead-free solder have an advantage that they are low in cost.

By the aforementioned method, a layer (hereinafter referred to as an "element formation layer 718") that includes the thin film transistors 700a to 700c, the conductive film 716, and the first electrode 715d of the electric double layer capacitor 104 can be fabricated.

Figure 9A:
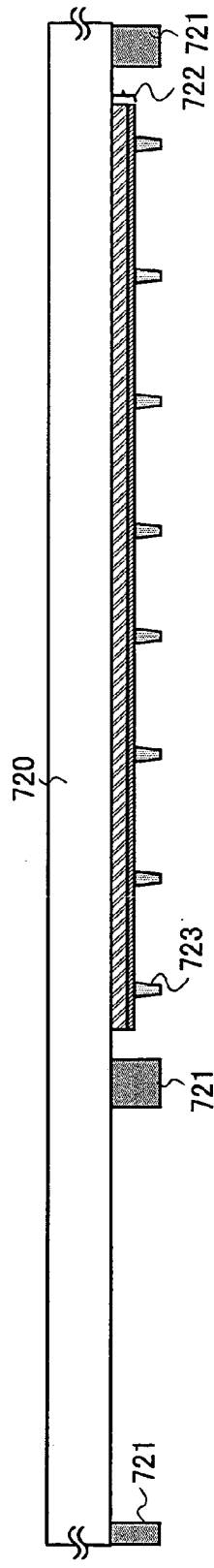
FIGS. 9A and 9B illustrate an exemplary method of fabricating a semiconductor device of the invention.

Next, steps of forming an electrode 722 and the like on a second substrate 720 will be described (FIG. 9A). The electrode 722 functions as a second electrode of the electric double layer capacitor. Note that the electrode 722 can be formed using the same material and the same method as the first electrode 715d. In addition, an insulating film may be formed between the second substrate 720 and the second electrode 722, using an insulating material such as silicon oxide, silicon nitride, silicon oxynitride ($SiO_xN_y$) ($x>y>0$), or silicon nitride oxide ($SiN_xO_y$) ($x>y>0$).

Further, a sealant 721 is formed on the second substrate 720. For the sealant 721, an acrylic photo-curing resin or an acrylic thermosetting resin may be used. The sealant 721 includes fillers (a diameter of 6 to 24 μm) and has a viscosity of 40 to 400 Pa·s. The sealant 721 separates a region where the conductive film 716 functioning as the antenna of the antenna circuit 101 is formed and a region where the electric double layer capacitor 104 is to be formed. Note that the sealant is provided with an inlet so that an electrolyte solution is injected thereto in a subsequent step. By mixing fillers in the sealant 721, the gap between the first electrode 715d and the second electrode 722 of the electric double layer capacitor can be controlled. In particular, when the electric double layer capacitor 104 occupies a large area of the RFID 100 or when flexible substrates are used for the first substrate 701 and the second substrate 720, fillers made of insulators are provided on the first electrode layer 715d or a separator is provided between the first electrode 715d and the second electrode 722, whereby short between the first electrode 715d and the second electrode 722 can be prevented. Further, spacers 723 may be provided to control the gap between the first electrode 715d and the second electrode 722. The spacers 723 may be formed through a photolithography process which includes the step of applying an organic insulating material such as photosensitive acrylic to the entire surface of the second substrate 720 by a spin coating method. Accordingly, photosensitive acrylic that remains on the second substrate 720 functions as spacers. This method allows the spacers to be positioned at desired places depending on mask patterns used in an exposure step. Therefore, the spacers 723 can be arranged at desired positions in a region where the electric double layer capacitor 104 is to be formed. In this manner, providing the spaces 724 can further prevent short between the first electrode 715d and the second electrode 722.

Figure 9B:
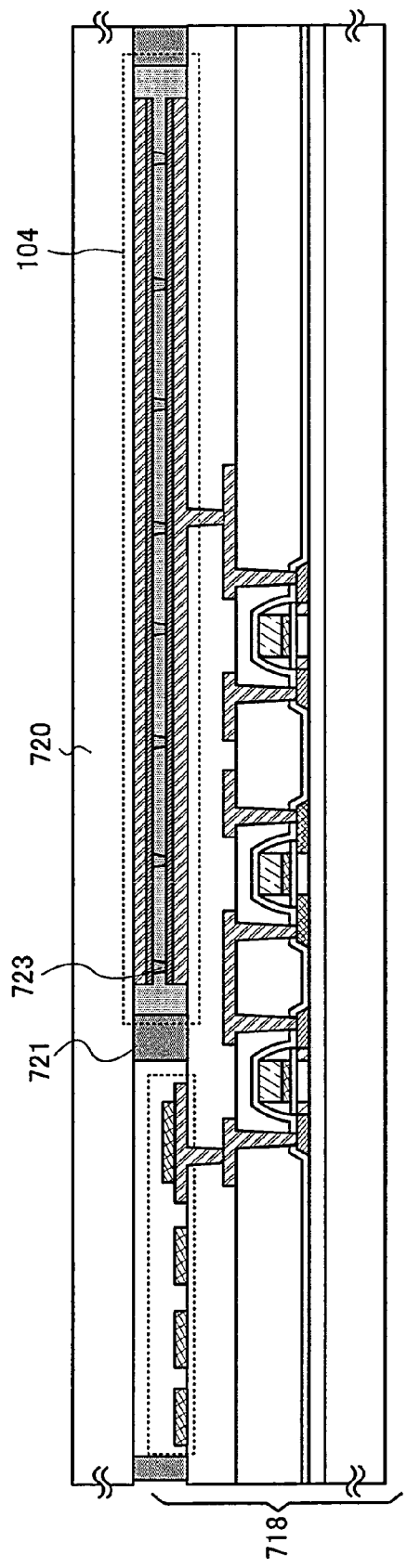

Next, as illustrated in FIG. 9B, the element formation layer 718 illustrated in FIG. 8B which has the signal processing circuit including the charging circuit 116, and the second substrate 720 illustrated in FIG. 9A which has the second electrode 722 and the sealant 721 are attached to each other.

Note that when the sealant is provided with two or more inlets, an electrolyte solution can be injected in atmospheric air by utilizing a capillary phenomenon. In this case, the electrolyte solution can be injected at faster speed as the viscosity of the electrolyte solution is lower. Meanwhile, when the sealant is provided with only one inlet, an electrolyte solution can be injected at reduced pressure.

Figure 10A:
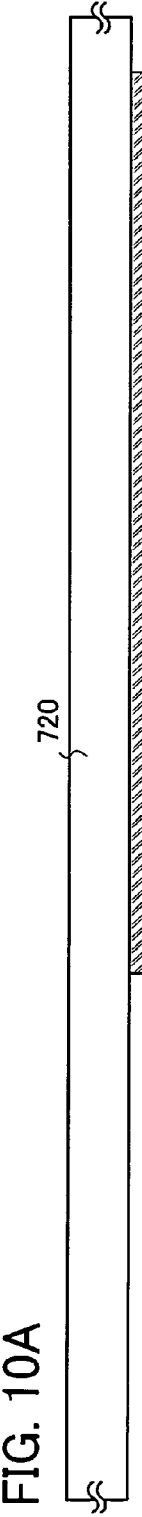
FIGS. 10A to 10C illustrate an exemplary method of fabricating a semiconductor device of the invention.
Figure 10B:
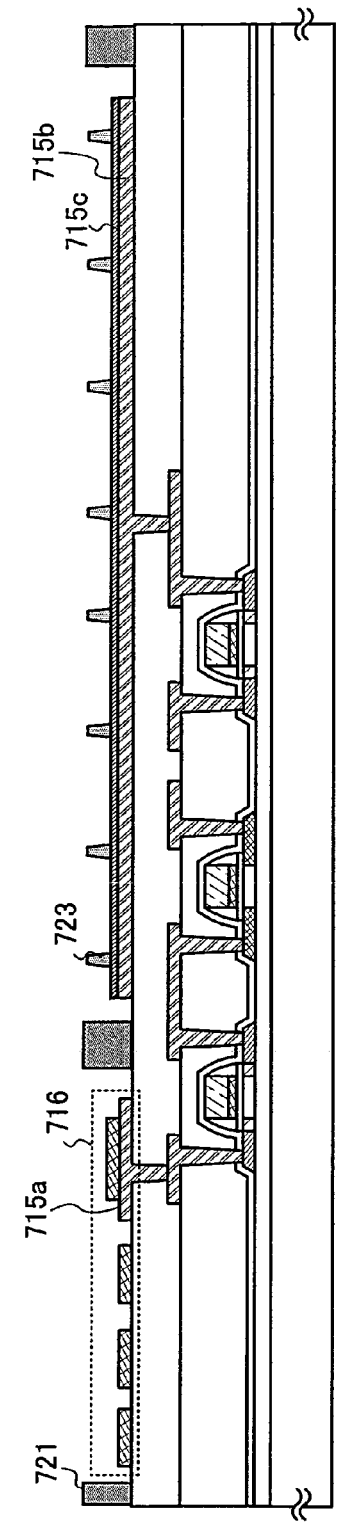

Instead of forming the sealant 721 on the second substrate 720, the sealant 721 may be formed on the first substrate 701 that has the signal processing circuit 102 including the charging circuit 116 (FIG. 10B). In this case, the electrolyte solution layer 12 is formed by dropping an electrolyte solution that is composed of an electrolyte and a solvent in a region where the electric double layer capacitor 104 is to be formed, excluding the region where the conductive film 716 is formed, by a droplet discharge method such as an inkjet method. For example, only the necessary amount of electrolyte solution may be dropped with a dispenser on the region where the electric double layer capacitor 104 is to formed, excluding the region where the conductive film 716 is formed. For the electrolyte solution, a substance with a viscosity low enough to be dropped, which has been described in the above embodiment mode, may be used. In the case of using a droplet discharge method such as an inkjet method, the viscosity of the electrolyte solution is preferably larger.

Figure 10C:
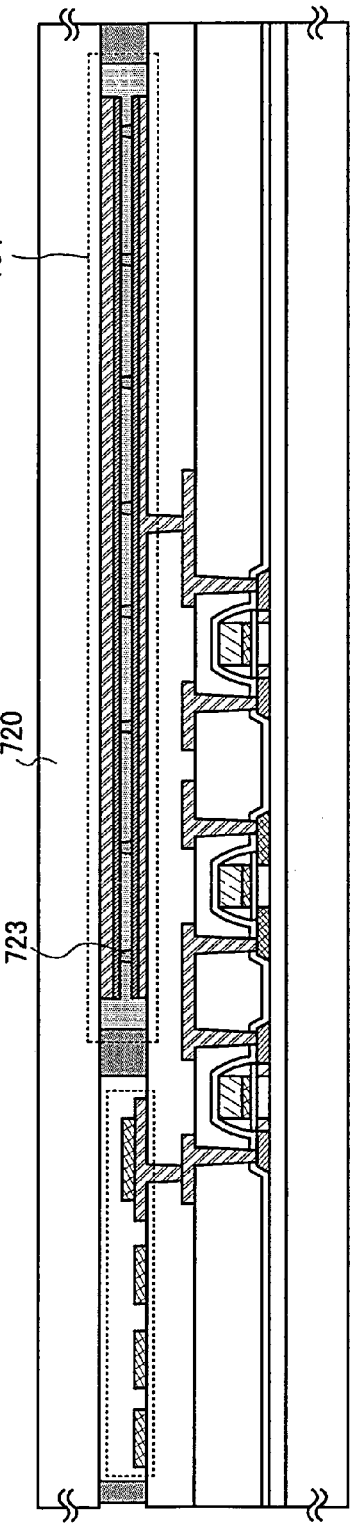

Next, as illustrated in FIG. 10C, the second substrate 720 having the second electrode 722 (FIG. 10A) and the element formation layer 718 on which the sealant 721 is formed and which has the signal processing circuit 102 including the charging circuit 116 (FIG. 10B) are attached to each other.

Figure 11A:
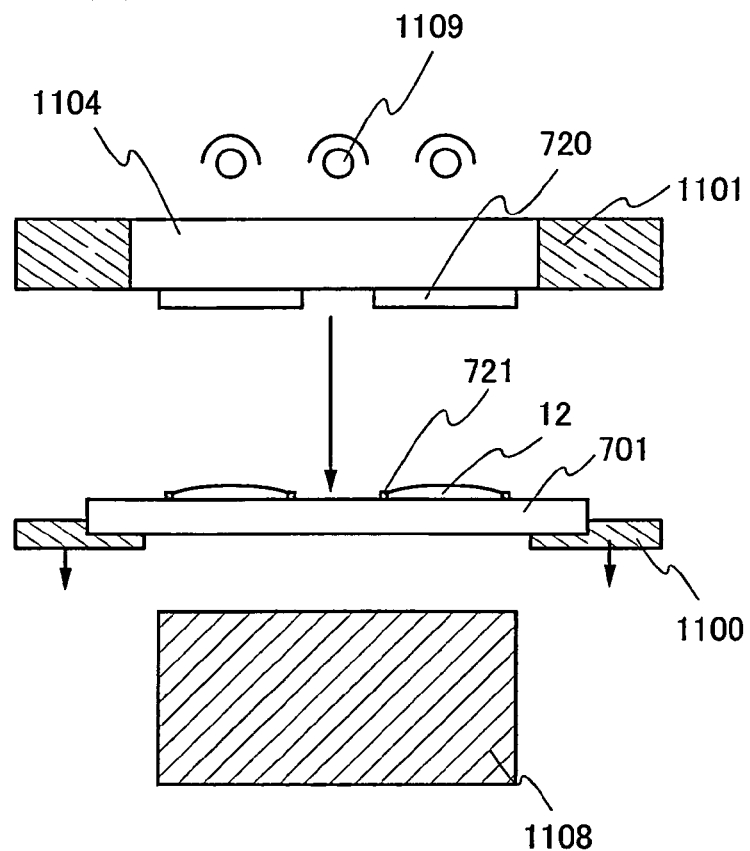
FIGS. 11A and 11B illustrate an exemplary device that is used for ultraviolet irradiation or thermal treatment.
Figure 11B:
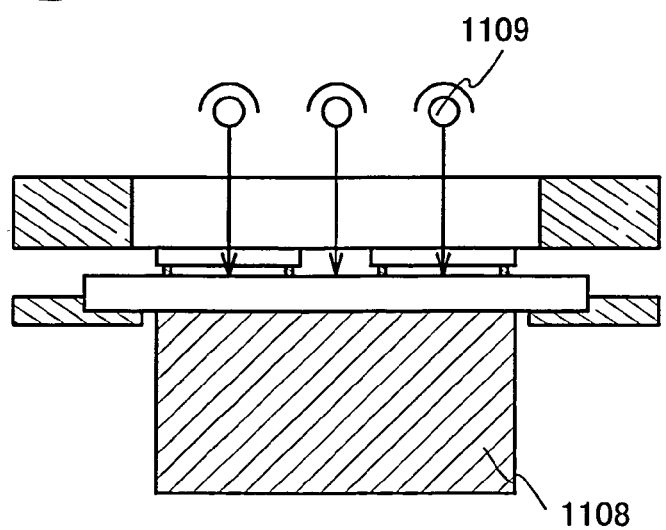

FIGS. 11A and 11B exemplarily illustrate an apparatus that is capable of ultraviolet irradiation or thermal treatment at the time of or after the attachment.

In FIGS. 11A and 11B, reference numeral 1100 denotes a first-substrate support that holds the first substrate 701, reference numeral 1101 denotes a second-substrate support that holds the second substrate 720, and reference numeral 1104 denotes a window that ultraviolet light and the like from a light source 1109 pass through. As described above, the sealant 721 and the electrolyte solution layer 12 are already formed in a region of the first substrate 701 where the electric double layer capacitor 104 is to be formed, excluding the region where the conductive film 716 is formed.

A heater is incorporated in a lower-side board 1108. In addition, the second-substrate support 1101 is provided with the window 1104 so that ultraviolet light and like from the light source 1109 pass through the window 1104. Although not illustrated here, alignment of the substrates is conducted through the window 1104. In addition, the second substrate 720 that serves as a counter substrate is fixed on the second-substrate support 1101 in advance. FIG. 11A illustrates the state before attachment.

During attachment, the positions of the first-substrate support and the second-substrate support are lowered; then, the first substrate 701 and the second substrate 720 are attached to each other with pressure applied; and then the sealant 721 is cured by ultraviolet irradiation. FIG. 11B illustrates the state during attachment.

Although FIGS. 11A and 11B illustrate the case where the sealant 721 is cured by ultraviolet irradiation, thermal treatment may be applied in addition to the ultraviolet irradiation.

Through the above steps, the electrolyte solution layer 12 is held between the first electrode 715d and the second electrode 722 of the electric double layer capacitor. In this embodiment, the step of dropping the electrolyte solution and the step of attachment are performed consecutively. In addition, in this embodiment, a cross-linking agent or the like is mixed into the electrolyte solution in advance before the thermal treatment or ultraviolet irradiation, so that the sealant 721 can be cured at the same time as the electrolyte solution layer 12 of the electric double layer capacitor 104 is made to have a gel property.

As described above, a semiconductor device can be fabricated in which the electric double layer capacitor 104 for storing electricity is formed over the same substrate as the antenna circuit 101, the signal processing circuit 102, and the like.

Note that this embodiment can be combined as appropriate with any of the embodiment mode and other embodiments.

[Embodiment 2]

This embodiment will specifically describe a method of fabricating a semiconductor device which includes the electric double layer capacitor 104 for storing electricity, the antenna circuit 101, and the signal processing circuit 102.

Figure 12A:
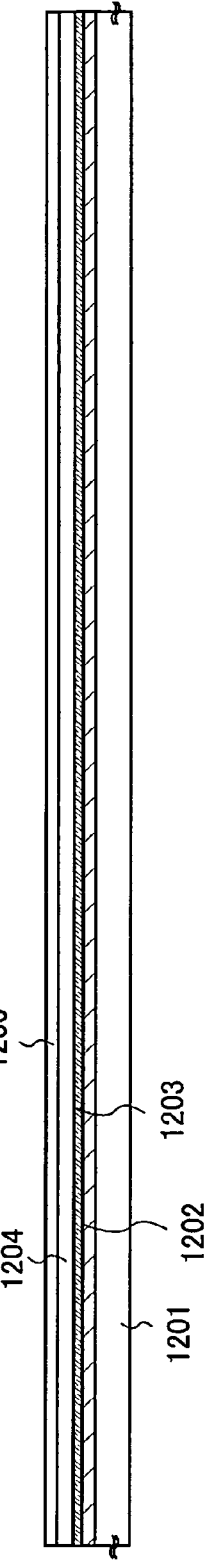
FIGS. 12A to 12D illustrate an exemplary method of fabricating a semiconductor device of the invention.

First, a release layer 1203 is formed over one surface of a substrate 1201 with an insulating film 1202 interposed therebetween (FIG. 12A). Then, an insulating film 1204 serving as a base film and a semiconductor film 1205 (for example, a film containing amorphous silicon) are sequentially stacked over the release layer 1203. Note that the insulating film 1202, the release layer 1203, the insulating film 1204, and the semiconductor film 1205 can be formed consecutively.

Note that the substrate 1201 can be any of a glass substrate, a quartz substrate, a metal substrate (for example, a stainless steel substrate), a ceramic substrate, and a semiconductor substrate such as a Si substrate. Note that in this step, the release layer 1203 is provided over the entire surface of the substrate 1201 with the insulating film 1202 interposed therebetween. However, it is also possible to provide a release layer over the entire surface of the substrate 1201 and selectively pattern the release layer by a lithography method or the like.

The insulating films 1202 and 1204 are each formed by a chemical vapor deposition (CVD) method, a sputtering method, or the like using an insulating material such as silicon oxide, silicon nitride, silicon oxynitride ($SiO_xN_y$) (x>y>0), or silicon nitride oxide ($SiN_xO_y$) (x>y>0). For example, when the insulating films 1202 and 1204 are each formed to have a two-layer structure, it is preferable to form a silicon nitride oxide film as a first insulating film and form a silicon oxynitride film as a second insulating film. Further, each of the insulating films 1202 and 1204 can also be formed by depositing a silicon nitride film as a first insulating film and depositing a silicon oxide film as a second insulating film. The insulating film 1202 serves as a blocking layer that prevents diffusion of impurity elements from the substrate 1201 into the releaser layer 1203 or to elements formed over the release layer 1203. In this manner, providing the insulating film 1202 that serves as a blocking layer and the insulating film 1204 can prevent adverse effects of alkali metals such as Na or alkaline earth metals from the substrate 1201, or impurity elements from the release layer 1203, which would otherwise be diffused into the elements formed over the release layer 1203. Note that the insulating films 1202 and 1204 may be omitted when quartz is used for the substrate 1201, for example.

The release layer 1203 may be formed with a metal film, a stacked-layer structure of a metal film and a metal oxide film, and the like. In the case of using a metal film, an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir), or an alloy material or compound material containing such an element as a main component is stacked either in a single layer or stacked layers. Such materials can be deposited by a sputtering method, various CVD methods such as a plasma CVD method, or the like. The stacked-layer structure of a metal film and a metal oxide film may be formed by the steps of depositing the aforementioned metal film and applying plasma treatment under an oxygen atmosphere or an $N_2O$ atmosphere or applying thermal treatment under an oxygen atmosphere or an $N_2O$ atmosphere, so that oxide or oxynitride of the metal film can be provided on the surface of the metal film. For example, when a tungsten film is provided as the metal film by a sputtering method, a chemical vapor deposition (CVD) method, or the like, a metal oxide film made of tungsten oxide can be formed on the surface of the tungsten film by applying plasma treatment to the tungsten film. In this case, tungsten oxide is represented by $WO_x$ (x is 2 to 3). The value of x may be 2 ($WO_2$), 2.5 ($W_2O_5$), 2.75 ($W_4O_{11}$), 3 ($WO_3$), and the like. In forming the tungsten oxide, x is not limited to a specific value, and which oxide is to be formed may be determined based on the etching rate and the like. For the plasma treatment, the aforementioned high-density-plasma treatment may be used. Further, in addition to the metal oxide film, metal nitride or metal oxynitride may be used. In that case, plasma treatment or thermal treatment may be applied to the metal film under a nitrogen atmosphere or an atmosphere containing nitrogen and oxygen.

The semiconductor film 1205 is formed to a thickness of 25 to 200 nm (preferably, 30 to 150 nm) by a sputtering method, an LPCVD method, a plasma CVD method, or the like.

Figure 12B:
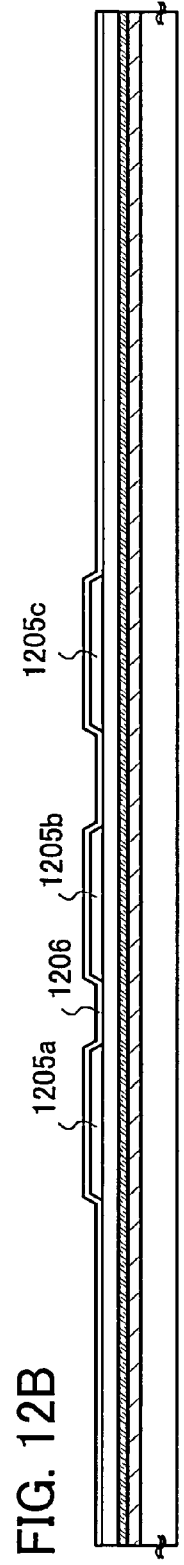

Next, the semiconductor film 1205 is irradiated with a laser beam to be crystallized. Note that the semiconductor film 1205 may also be crystallized by combining laser irradiation with a thermal crystallization method that uses RTA or an annealing furnace or with a thermal crystallization method that uses a metal element for promoting crystallization. Then, the crystalline semiconductor film is patterned into a desired shape by etching, so that crystalline semiconductor films 1205a to 1205c are formed (FIG. 12B). Then, a gate insulating film 1206 is formed to cover the crystalline semiconductor films 1205a to 1205c.

Note that the gate insulating film 1206 is formed by a chemical vapor deposition (CVD) method, a sputtering method, or the like using an insulating material such as silicon oxide, silicon nitride, silicon oxynitride ($SiO_xN_y$) (x>y>0), or silicon nitride oxide ($SiN_xO_y$) (x>y>0). For example, when the gate insulating film 1206 is formed to have a two-layer structure, it is preferable to form a silicon oxynitride film as a first insulating film and form a silicon nitride oxide film as a second insulating film. Further, the gate insulating film 1206 can also be formed by depositing a silicon oxide film as a first insulating film and depositing a silicon nitride film as a second insulating film.

A fabrication process of the crystalline semiconductor films 1205a to 1205c will be briefly described below. First, an amorphous semiconductor film with a thickness of 50 to 60 nm is deposited by a plasma CVD method. Then, a solution containing nickel that is a metal element for promoting crystallization is applied to and retained on the amorphous semiconductor film. Then, the amorphous semiconductor film is subjected to dehydrogenation treatment (500° C. for one hour) and thermal crystallization treatment (550° C. for four hours), so that a crystalline semiconductor film is obtained. After that, the crystalline semiconductor film is patterned into crystalline semiconductor films 1205a to 1205c by a photolithography method using laser irradiation. Note that the amorphous semiconductor film may be crystallized by only laser irradiation without the thermal crystallization that uses a metal element for promoting crystallization.

As a laser oscillator used for crystallization, either a continuous-wave laser (CW laser) or a pulsed laser can be used. Laser beams that can be used here include beams emitted from one or more kinds of the following lasers: a gas laser such as an Ar laser, a Kr laser, or an excimer laser; a laser in which single-crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ is used as a medium, and one or more of Nd, Yb, Cr, Ti, Ho, Er, Tm, and Ta is added thereto as a dopant; a glass laser; a ruby laser; an alexandrite laser; a Ti:sapphire laser; a copper vapor laser; and a gold vapor laser. Crystals with a large grain diameter can be obtained by irradiation with the fundamental wave of the above laser beam or the second harmonic to the fourth harmonic of the fundamental wave thereof. For example, the second harmonic (532 nm) or the third harmonic (355 nm) of a Nd:$YVO_4$ laser (the fundamental wave: 1064 nm) can be used. At this time, the power density of the laser needs to be about 0.01 to 100 $MW/cm^2$ (preferably, 0.1 to 10 $MW/cm^2$). A scanning rate is set to about 10 to 2000 cm/sec for irradiation. Note that the laser in which single-crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ is used as a medium and one or more of Nd, Yb, Cr, Ti, Ho, Er, Tm, and Ta is added thereto as a dopant; an Ar ion laser; or a Ti:sapphire laser can perform CW operation. Alternatively, it can also perform pulsed operation at a repetition rate of greater than or equal to 10 MHz by combining Q-switching operation, mode locking, or the like. When a laser beam is pulsed at a repetition rate of greater than or equal to 10 MHz, it is possible for a semiconductor film to be irradiated with the next pulse after it is melted by the previous laser beam and before it becomes solidified. Therefore, unlike the case of using a pulsed laser with a low repetition rate, a solid-liquid interface of the semiconductor film can be moved continuously. Thus, crystal grains that have grown continuously in the scanning direction can be obtained.

The gate insulating film 1206 may also be formed by oxidizing or nitriding the surfaces of the semiconductor films 1205a to 1205c by the aforementioned high-density-plasma treatment. For example, the gate insulating film 1206 is formed by plasma treatment with a mixed gas of a rare gas such as He, Ar, Kr, or Xe, and oxygen, nitrogen oxide ($NO_2$), ammonia, nitrogen, hydrogen, or the like. When plasma is excited by introduction of microwaves, plasma with a low electron temperature and high electron density can be generated. The surfaces of the semiconductor films can be oxidized or nitrided by oxygen radicals (there may also be OH radicals) or nitrogen radicals (there may also be NH radicals) that are generated by the high-density-plasma treatment.

By such high-density-plasma treatment, an insulating film with a thickness of 1 to 20 nm, typically 5 to 10 nm is formed on the semiconductor films. Since the reaction in this case is a solid-phase reaction, interface state density between the insulating film and the semiconductor films can be extremely low. Such high-density-plasma treatment directly oxidizes (or nitrides) the surfaces of the semiconductor films (crystalline silicon or polycrystalline silicon). Therefore, variations in thickness of the insulating film to be formed can be ideally quite small. In addition, since the crystal grain boundaries of crystalline silicon are not strongly oxidized, an excellent state is obtained. That is, by solid-phase oxidizing the surfaces of the semiconductor films by high-density-plasma treatment as described here, an insulating film with a uniform thickness and low interface state density can be formed without local oxidation reaction at the crystal grain boundaries.

Note that the gate insulating film 1206 may be formed using only an insulating film deposited by high-density-plasma treatment. Further, an insulating film such as silicon oxide, silicon oxynitride, or silicon nitride may be deposited thereon by a CVD method with plasma or thermal reaction. In any case, a transistor which includes an insulating film formed by high-density-plasma treatment in a part or the whole of its gate insulating film can have small variations in characteristics.

Furthermore, the semiconductor films 1205a to 1205c, which are obtained by crystallizing a semiconductor film by irradiation with a continuous-wave laser beam or with a laser beam pulsed at a repetition rate of greater than or equal to 10 MHz while scanning in one direction, have a characteristic in having crystals that have grown in the beam scanning direction. When transistors are arranged such that their channel length directions (directions in which carriers flow when channel formation regions are formed) are disposed in the same direction as the scanning direction, and combined with the aforementioned gate insulating layer, thin film transistors (TFTs) with small variations in characteristics and high electron field-effect mobility can be obtained.

Next, a first conductive film and a second conductive film are stacked over the gate insulating film 1206. Here, the first conductive film is formed to a thickness of 20 to 100 nm by a chemical vapor deposition (CVD) method, a sputtering method, or the like. The second conductive film is formed to a thickness of 100 to 400 nm. Each of the first conductive film and the second conductive film is formed using an element selected from tantalum (Ta), tungsten (W), titanium (Ti), molybdenum (Mo), aluminum (Al), copper (Cu), chromium (Cr), niobium (Nb), or the like, or an alloy material or compound material containing such an element as a main component. Alternatively, a semiconductor material typified by polycrystalline silicon doped with an impurity element such as phosphorus may be used. Examples of the combination of the first conductive film and the second conductive film include a tantalum nitride film and a tungsten film; a tungsten nitride film and a tungsten film; and a molybdenum nitride film and a molybdenum film. Tungsten and tantalum nitride have high heat resistance. Therefore, when they are used for the first conductive film and the second conductive film, thermal treatment for thermal activation may be applied after the formation of the first conductive film and the second conductive film. In addition, when the gate insulating film 1206 is formed to have not a two-layer structure but a three-layer structure, a stacked-layer structure of a molybdenum film, an aluminum film, and a molybdenum film is preferably used.

Next, resist masks are formed by a photolithography method, and etching treatment for forming gate electrodes and gate lines is applied, so that gate electrodes 1207 are formed above the semiconductor films 1205a to 1205c. Illustrated here is an example in which each gate electrode 1207 has a stacked-layer structure of a first conductive film 1207a and a second conductive film 1207b.

Figure 12C:
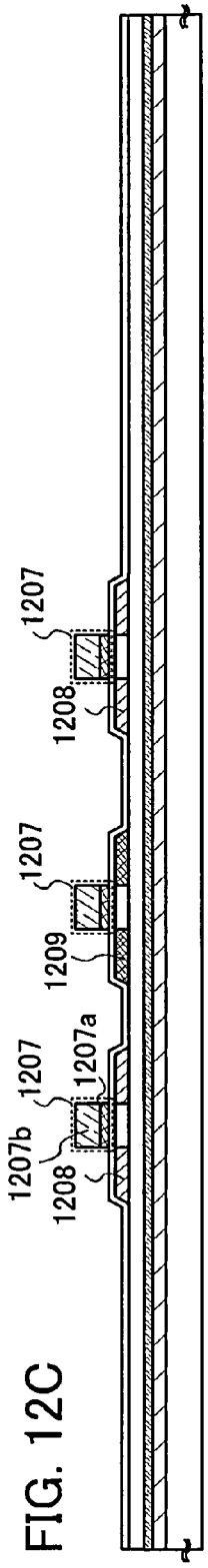

Next, the semiconductor films 1205a to 1205c are doped with an n-type impurity element with the gate electrodes 1207 as masks, by an ion doping method or an ion implantation method so that the semiconductor films 1205a to 1205c contain the n-type impurity element at a low concentration (FIG. 12C). Then, resist masks are selectively formed by a photolithography method and the semiconductor film 1205b is doped with a p-type impurity element so that the semiconductor film 1205b contains the p-type impurity element at a high concentration. Examples of the n-type impurity element include phosphorus (P) and arsenic (As). Examples of the p-type impurity element include boron (B), aluminum (Al), and gallium (Ga). Here, phosphorus (P) is used as the n-type impurity element and selectively added to the semiconductor films 1205a to 1205c so that the semiconductor films 1205a to 1205c contain phosphorus at a concentration of $1\times10^{15}$ to $1\times10^{19}/\text{cm}^3$. Accordingly, n-type impurity regions 1208 are formed. In addition, boron (B) is used as the p-type impurity element and selectively added to the semiconductor film 1205b so that the semiconductor film 1205b contains boron (B) at a concentration of $1\times10^{19}$ to $1\times10^{20}/\text{cm}^3$. Accordingly, p-type impurity regions 1209 are formed.

Next, an insulating film is formed to cover the gate insulating film 1206 and the gate electrodes 1207. The insulating film is formed by depositing a film containing an inorganic material such as silicon, silicon oxide, or silicon nitride, or a film containing an organic material such as an organic resin by a plasma CVD method, a sputtering method, or the like, and has a single-layer structure or a stacked-layer structure. Then, the insulating film is selectively etched by anisotropic etching (etching mainly in a perpendicular direction), so that insulating films (also referred to as sidewalls) 1210 that are in contact with the side surfaces of the gate electrodes 1207 are formed. The insulating films 1210 are used as doping masks for formation of LDD (lightly doped drain) regions.

Next, the semiconductor films 1205a and 1205c are doped with an n-type impurity element, using resist masks formed by a photolithography method, the gate electrodes 1207, and the insulating films 1210 as masks, so that the semiconductor films 1205a and 1205c contain the n-type impurity element at a high concentration. Accordingly, n-type impurity regions 1211 are formed. Here, phosphorus (P) is used as the n-type impurity element and selectively added to the semiconductor films 1205a and 1205c so that the semiconductor films 1205a and 1205c contain phosphorus at a concentration of $1\times10^{19}$ to $1\times10^{20}/\text{cm}^3$. Accordingly, the n-type impurity regions 1211 having a higher concentration of impurity than the impurity regions 1208 are formed.

Figure 12D:
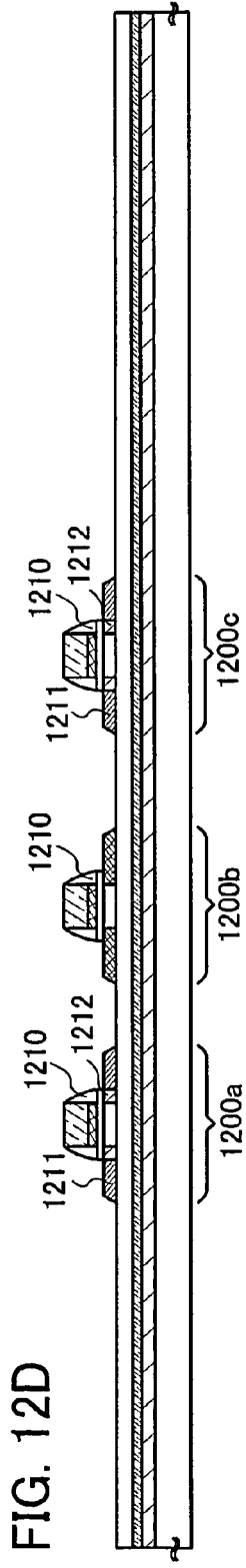

Through the above steps, n-channel thin film transistors 1200a and 1200c and a p-channel thin film transistor 1200b are formed (FIG. 12D).

In the n-channel thin film transistor 1200a, a channel formation region is formed in a region of the semiconductor film 1205a which overlaps with the gate electrode 1207; impurity regions 1211 that form source and drain regions are formed in regions which do not overlap with the gate electrode 1207 or the insulating films 1210; and lightly doped drain regions (LDD regions) 1212 are formed in regions which overlap with the insulating films 1210 and are located between the channel formation region and the impurity regions 1211. Similarly, the channel formation region, the lightly doped drain regions 1212, and the impurity regions 1211 are also formed in the n-channel thin film transistor 1200c.

In the p-channel thin film transistor 1200b, a channel formation region is formed in a region of the semiconductor film 1205b which overlaps with the gate electrode 1207, and the impurity regions 1209 that form source and drain regions are formed in regions which do not overlap with the gate electrode 1207. Although LDD regions are not provided in the p-channel thin film transistor 1200b here, the LDD regions may be provided in the p-channel thin film transistor. Also, the LDD regions are not necessarily provided in the n-channel thin film transistors.

Next, an insulating film with a single layer or stacked layers is formed to cover the semiconductor films 1205a to 1205c, the gate electrodes 1207, and the like (FIG. 13A). Then, conductive films 1213 are formed over the insulating film to be electrically connected to the impurity regions 1209 and 1211 that form the source and drain regions of the thin film transistors 1200a to 1200c. The insulating film is formed either in a single layer or stacked layers by a chemical vapor deposition (CVD) method, a sputtering method, an SOG method, a droplet discharge method, a screen printing method, or the like, using an inorganic material such as silicon oxide or silicon nitride; an organic material such as polyimide, polyamide, benzocyclobutene, acrylic, or epoxy; a siloxane material; and/or the like. Here, the insulating film is formed to have two layers. Specifically, a silicon nitride oxide film is formed as a first insulating film 1212a and a silicon oxynitride film is formed as a second insulating film 1212b. The conductive films 1213 form the source and drain electrodes of the semiconductor films 1205a to 1205c.

Note that before the formation of the insulating films 1212a and 1212b, or after the formation of one or both of the insulating films 1212a and 1212b, thermal treatment is preferably applied in order to recover the crystallinity of the semiconductor films, activate the impurity elements added to the semiconductor films, or hydrogenate the semiconductor films. The thermal treatment is preferably performed by thermal annealing, laser annealing, RTA, or the like.

The conductive film 1213 is formed either in a single layer or stacked layers by a chemical vapor deposition (CVD) method, a sputtering method, or the like, using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or compound material containing such an element as a main component. An alloy material containing aluminum as a main component is, for example, an alloy material which contains aluminum as a main component and contains nickel, or an alloy material which contains aluminum as a main component and contains one or both of carbon and silicon. The conductive film 1213 preferably has a stacked-layer structure of, for example, a barrier film, an aluminum silicon (Al—Si) film, and a barrier film, or a stacked-layer structure of a barrier film, an aluminum silicon (Al—Si) film, a titanium nitride film, and a barrier film. Note that the barrier film corresponds to a thin film made of titanium, titanium nitride, molybdenum, or molybdenum nitride. Aluminum and aluminum silicon, which have low resistance values and are inexpensive, are the most suitable materials for forming the conductive film 1213. When barrier layers are provided as the top layer and the bottom layer of the conductive film 1213, generation of hillock of aluminum or aluminum silicon can be prevented. Further, when a barrier film made of titanium that is an element having a high reducing property is formed, even when there is a thin natural oxide film formed on the crystalline semiconductor film, the natural oxide film can be reduced, so that the conductive film 1213 can form a favorable contact with the crystalline semiconductor film.

Next, an insulating film 1214 is formed to cover the conductive films 1213, and conductive films 1215a and 1215b are formed over the insulating film 1214 to be electrically connected to the conductive films 1213 that form the source or drain electrodes of the semiconductor films 1205a and 1205c. As illustrated in Embodiment 1, the conductive films 1215a and 1215b that are electrically connected to the conductive films 1213 are formed either in a single layer or stacked layers by a chemical vapor deposition (CVD) method, a sputtering method, or the like, using an element selected from aluminum (Al), tungsten (W), titanium (Ti), tantalum (Ta), molybdenum. (Mo), nickel (Ni), platinum (Pt), copper (Cu), gold (Au), silver (Ag), manganese (Mn), neodymium (Nd), carbon (C), or silicon (Si), or an alloy material or compound material containing such an element as a main component. After that, iron, cobalt, nickel, copper, or the like that functions as a metal catalyst is formed over the conductive film 1215b by a spin coating method. Then, nano-level carbon such as a carbon nanotube is grown by an arc discharge method, a laser evaporation method, a laser ablation method, or chemical vapor deposition (CVD) method, so that a layer 1215c that has a function of increasing the specific surface area of an electrode is formed. Accordingly, a first electrode of an electric double layer capacitor that has low resistance and a large specific surface area is formed. Note that the conductive film 1215b and the layer 1215c function as a first electrode 1215d of the electric double layer capacitor. The first electrode 1215d may also be formed without using the conductive film 1215b. In that case, the first electrode 1215d may be formed using only the layer 1215c that is made of activated carbon; nano-level carbon such as fullerene or a vertically aligned carbon nanotube; metal oxide; conductive high molecular compounds; or the like.

Next, a conductive film 1216 that functions as an antenna is formed to be electrically connected to the conductive film 1215a (FIG. 13B). Here, the conductive film 1216 that functions as the antenna corresponds to the antenna 303 of the antenna circuit 101 illustrated in the embodiment mode.

Note that the insulating film 1214 can be formed either in a single layer or stacked layers by a chemical vapor deposition (CVD) method, a sputtering method, or the like, using an insulating material containing oxygen or nitrogen, such as silicon oxide ($SiO_x$), silicon nitride ($SiN_x$), silicon oxynitride ($SiO_xN_y$) (x>y>0), or silicon nitride oxide ($SiN_xO_y$) (x>y>0); a film containing carbon such as DLC (diamond-like carbon); an organic material such as epoxy, polyimide, polyamide, polyvinyl phenol, benzocyclobutene, or acrylic; or a siloxane material such as a siloxane resin. Note that a siloxane material is a material having a Si—O—Si bond. Siloxane has a skeletal structure with the bond of silicon (Si) and oxygen (O). As a substituent of siloxane, an organic group containing at least hydrogen (e.g., an alkyl group or an aryl group) is used. A fluoro group may also be used as the substituent. Alternatively, both an organic group containing at least hydrogen and a fluoro group may be used as the substituent.

The conductive film 1216 is formed by depositing a conducive material by a chemical vapor deposition (CVD) method, a sputtering method, a printing method such as screen printing or gravure printing, a droplet discharge method, a dispenser method, a plating method, or the like. The conductive material can be an element selected from aluminum (Al), titanium (Ti), silver (Ag), copper (Cu), gold (Au), platinum (Pt), nickel (Ni), palladium (Pd), tantalum (Ta), or molybdenum (Mo), or an alloy material or compound material containing such an element as a main component. The conductive film 1216 may have either a single-layer structure or a stacked-layer structure.

When the conductive film 1216 that functions as the antenna is formed by a screen printing method, for example, conductive paste, in which conductive particles with a grain diameter of several nanometers to several tens of nanometers are diffused or dispersed in an organic resin, may be selectively printed. For the conductive particles, metal particles including at least one type of metal such as silver (Ag), gold (Au), copper (Cu), nickel (Ni), platinum (Pt), palladium (Pd), tantalum (Ta), molybdenum (Mo), and titanium (Ti); fine particles of silver halide; or dispersant nanoparticles can be used. In addition, for an organic resin included in the conductive paste, one or more of organic resins functioning as a binder, a solvent, a dispersant, and a covering material for metal particles can be used. Typical examples of organic resins include an epoxy resin and a silicone resin. In addition, in forming the conductive film, baking is preferably performed after the conductive paste is pushed out. For example, in the case of using fine particles (for example, a grain diameter of greater than or equal to 1 nm and less than or equal to 100 nm) containing silver as a main component as a material for the conductive paste, the conductive film can be obtained by curing the conductive paste by baking at a temperature in the range of 150 to 300° C. In addition, fine particles containing solder or lead-free solder as a main component may be used, and in this case, fine particles with a grain diameter of less than or equal to 20 μm is preferably used. Solder and lead-free solder have an advantage that they are low in cost.

Next, a layer (hereinafter referred to as an "element formation layer 1218") that includes the thin film transistors 1200a to 1200c and the conductive film 1216 is peeled off the substrate 1201. Here, the element formation layer 1218 is partly irradiated with laser beams (for example, UV light), whereby openings are formed in regions excluding the thin film transistors 1200a to 1200c (FIG. 13C). After that, the element formation layer 1218 can be peeled off the substrate 1201 with a physical force. Note that before the element formation layer 1218 is peeled off the substrate 1201, a flexible substrate 1220 having a conductive film and the element formation layer 1218 are attached to each other with a sealant 1221 by a method similar to that in Embodiment 1 (FIG. 14A). The conductive film of the flexible substrate 1220 functions as a second electrode 1222 of the electric double layer capacitor. When fillers are mixed in the sealant 1221, the gap between the first electrode 1215d and the second electrode 1222 of the electric double layer capacitor 104 can be easily controlled. In addition, when fillers made of insulators are provided on the first electrode layer 1215d or a separator is provided between the first electrode 1215d and the second electrode 1222 as in Embodiment 1, short between the first electrode 1215d and the second electrode 1222 can be prevented. Further, spacers 1223 may be provided to control the gap between the first electrode 1215d and the second electrode 1222 as in Embodiment 1. Note that a first sheet material may also be used as the flexible substrate 1220.

Before the element formation layer 1218 is peeled off the substrate 1201, an etchant may be introduced into the openings, so that the release layer 1203 can be selectively removed. For the etchant, gas or liquid containing halogen fluoride or an interhalogen compound is used; for example, chlorine trifluoride ($ClF_3$) is used as a gas containing halogen fluoride. Then, the element formation layer 1218 is peeled off the substrate 1201 (FIG. 14B). Note that the release layer 1203 does not have to be completely removed and may be partly left. Accordingly, consumption of the etchant can be suppressed, and the processing time required for removing the release layer becomes short. In addition, even after the release layer 1203 is removed, the element formation layer 1218 can be retained above the substrate 1201. Further, when the substrate 1201 that the element formation layer 1218 is peeled off is reused, reduction in cost can be achieved.

In this embodiment, a first sheet material 1219 is attached to one surface (a surface in which the flexible substrate 1220 is exposed) of the element formation layer 1218, and then the element formation layer 1218 is peeled off the substrate 1201.

Figure 15:
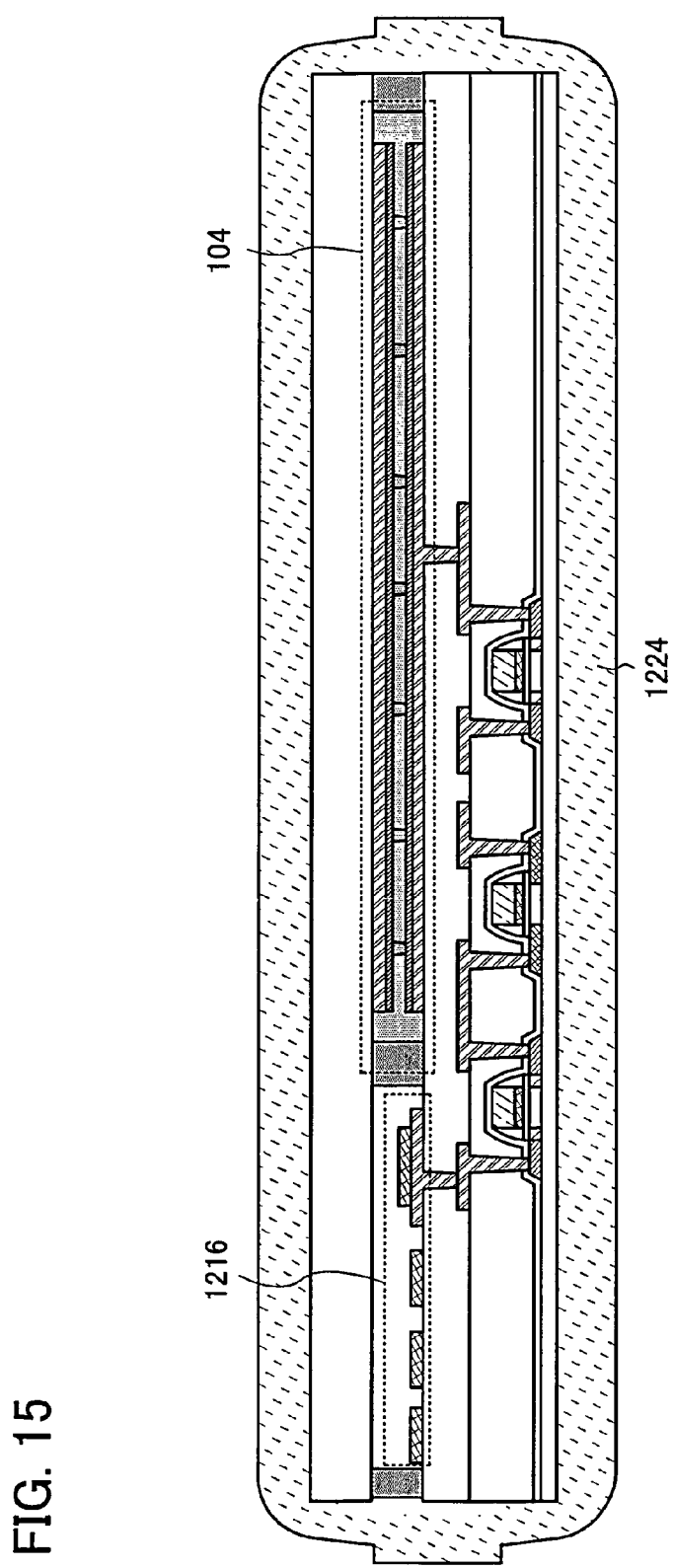
FIG. 15 illustrates an exemplary method of fabricating a semiconductor device of the invention.

Next, a second sheet material 1224 is attached to the other surface (a surface exposed by peeling) of the element formation layer 1218, and one or both of thermal treatment and pressure treatment is/are applied to fix the second sheet material 1224 (FIG. 15). This thermal treatment cures the sealant 1221. Note that ultraviolet irradiation may also be applied in addition to the thermal treatment. When a cross-linking agent or the like is mixed into an electrolyte solution in advance before the thermal treatment or ultraviolet irradiation, the sealant 1221 can be cured at the same time as the electrolyte solution layer 12 of the electric double layer capacitor 104 is made to have a gel property. Note that a hot-melt film or the like can be used for each of the first sheet material 1219 and the second sheet material 1224.

For the first sheet material 1219 and the second sheet material 1224, a film on which antistatic treatment for preventing static electricity or the like has been applied (hereinafter referred to as an antistatic film) can also be used. Examples of the antistatic film include a film in which an antistatic material is dispersed in a resin and a film to which an antistatic material is attached. The film provided with an antistatic material can be a film with an antistatic material provided over one of its surfaces, or a film with an antistatic material provided over each of its surfaces. Concerning the film with an antistatic material provided over one of its surfaces, the film may be attached to the element formation layer 1218 so that the antistatic material is placed on the inner side of the film or the outer side of the film. The antistatic material may be provided over the entire surface of the film, or over part of the film. Examples of the antistatic material include a metal, indium tin oxide (ITO), and a surfactant such as an amphoteric surfactant, a cationic surfactant, or a nonionic surfactant. In addition, as an antistatic material, a resin material which contains a cross-linked copolymer having a carboxyl group and a quaternary ammonium base on its side chain, or the like can be used. By attaching, mixing, or applying such a material to a film, an antistatic film can be formed. By sealing the element formation layer 1218 with the antistatic film, the semiconductor elements can be prevented from adverse effects such as external static electricity when dealt with as a commercial product.

Through the above steps, the electrolyte solution layer 12 is held between the first electrode 1215d and the second electrode 1222 of the electric double layer capacitor 104 in the region where the electric double layer capacitor 104 is formed, excluding the region where the conductive film 1216 is formed.

As described above, a semiconductor device, which includes the electric double layer capacitor 104 for storing electricity, the antenna circuit 101, and the signal processing circuit 102, can be fabricated. Even when the thusly fabricated semiconductor device, namely RFID is attached to an object with a curved surface, bending stress exerted on the conductive film 1213 that connects the electric double layer capacitor 104 and the signal processing circuit 102 and bending stress exerted on the first electrode 1215d of the electric double layer capacitor are small. Therefore, breaking of the wirings can be prevented. Further, since there is no need to use an anisotropic conductive film for mounting the electric double layer capacitor 104 on the RFID 100 unlike the conventional technique, the thickness of the RFID can be thin.

Note that this embodiment can be combined as appropriate with any of the embodiment mode and other embodiments.

[Embodiment 3]

This embodiment will describe a method of fabricating a semiconductor device of the invention, which differs from those in Embodiments 1 and 2, with reference to partial cross-sectional views illustrated in FIGS. 16A to 16C, 17A to 17C, and 18. Transistors included in the semiconductor device of the invention can be not only thin film transistors formed over an insulating surface which have been illustrated in the above embodiment mode, but also MOS transistors formed on a single-crystalline substrate.

Figure 16A:
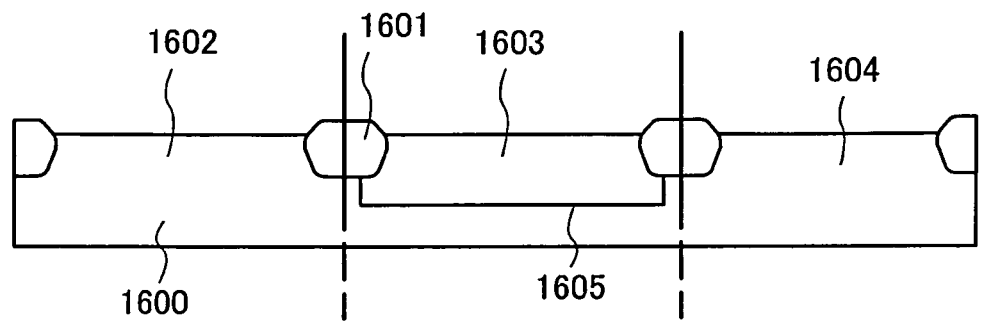
FIGS. 16A to 16C illustrate an exemplary method of fabricating a semiconductor device of the invention.

First, element isolation regions 1602 to 1604 (hereinafter also referred to as regions 1602 to 1604) are formed in a semiconductor substrate 1600 (FIG. 16A). The regions 1602 to 1604 provided in the semiconductor substrate 1600 are isolated from each other by insulating films (also referred to as field oxide films) 1601. An example shown herein is the case where a single-crystalline Si substrate having n-type conductivity is used for the semiconductor substrate 1600 and a p well 1605 is provided in the region 1603 of the semiconductor substrate 1600.

The substrate 1600 may be any substrate as long as it is a semiconductor substrate. For example, a single-crystalline Si substrate having n-type conductivity or p-type conductivity, a compound semiconductor substrate (a GaAs substrate, an InP substrate, a GaN substrate, a SiC substrate, a sapphire substrate, a ZnSe substrate, or the like), an SOI (silicon on insulator) substrate formed by a bonding method or a SIMOX (separation by implanted oxygen) method, or the like can be used.

The element isolation regions 1602 to 1604 can be formed by using as appropriate a selective oxidation method (LO-COS; local oxidation of silicon), a trench isolation method, or the like.

The p well 1605 formed in the region 1603 of the semiconductor substrate 1600 can be formed by selectively doping the semiconductor substrate 1600 with a p-type impurity element. Examples of the p-type impurity element include boron (B), aluminum (Al), and gallium (Ga).

Note that in this embodiment, the regions 1602 and 1604 are not doped with an impurity element because an n-type semiconductor substrate is used as the semiconductor substrate 1600; however, n wells may be formed in the regions 1602 and 1604 by doping them with an n-type impurity element. Examples of the n-type impurity element include phosphorus (P) and arsenic (As). Meanwhile, when a p-type semiconductor substrate is used, n wells may be formed by doping the regions 1602 and 1604 with an n-type impurity element and not doping the region 1603 with an impurity element.

Figure 16B:
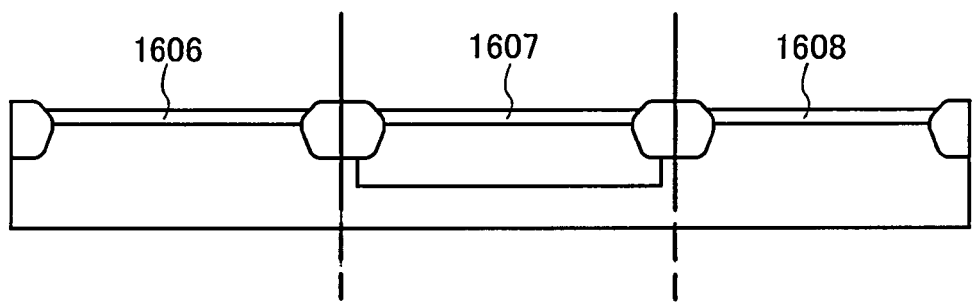

Next, insulating films 1606 to 1608 are formed to cover the regions 1602 to 1604, respectively (FIG. 16B).

The insulating films 1606 to 1608 can be formed using, for example, silicon oxide films that are obtained by oxidizing the surfaces of the regions 1602 to 1604 provided in the semiconductor substrate 1600 by thermal treatment. Further, after the formation of the silicon oxide films by thermal oxidation, the surfaces of the silicon oxide films may be nitrided by nitridation treatment, so that a stacked-layer structure of a silicon oxide film and a film containing oxygen and nitrogen (a silicon oxynitride film) is formed.

Further, the insulating films 1606 to 1608 can also be formed by plasma treatment as described above. For example, by applying high-density-plasma oxidation treatment or high-density-plasma nitridation treatment to the surfaces of the regions 1602 to 1604 provided in the semiconductor substrate 1600, silicon oxide ($SiO_x$) films or silicon nitride ($SiN_x$) films can be formed as the insulating films 1606 to 1608. Further, after oxidizing the surfaces of the regions 1602 to 1604 by high-density-plasma oxidation treatment, high-density-plasma nitridation treatment may be applied. In this case, silicon oxide films are formed on the surfaces of the regions 1602 to 1604, and silicon oxynitride films are formed on the silicon oxide films. Therefore, each of the insulating films 1606 to 1608 has a stack of a silicon oxide film and a silicon oxynitride film. In addition, after the formation of the silicon oxide films on the surfaces of the regions 1602 to 1604 by thermal oxidation, high-density-plasma oxidation treatment or high-density-plasma nitridation treatment may be applied.

Note that the insulating films 1606 to 1608 function as gate insulating films of transistors that are completed in subsequent steps.

Figure 16C:
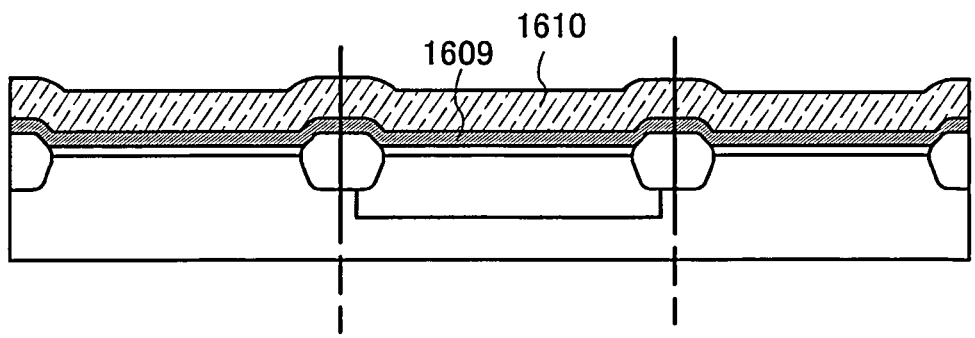

Next, a conductive film is formed to cover the insulating films 1606 to 1608 that are formed above the regions 1602 to 1604, respectively (FIG. 16C). Here, an example is shown in which the conductive film is formed by sequentially stacking a conductive film 1609 and a conductive film 1610. Needless to say, the conductive film may have a single-layer structure or a stacked-layer structure of more than two layers.

The conductive films 1609 and 1610 can be formed using an element selected from tantalum (Ta), tungsten (W), titanium (Ti), molybdenum (Mo), aluminum (Al), copper (Cu), chromium (Cr), niobium (Nb), or the like, or an alloy material or compound material containing such an element as a main component. Alternatively, a metal nitride film that is formed by nitriding the above element may be used. As a further alternative, a semiconductor film typified by polycrystalline silicon doped with an impurity element such as phosphorus or the like may be used.

Here, tantalum nitride is deposited as the conductive film 1609, and tungsten is stacked thereover as the conductive film 1610. Alternatively, a single layer or a stacked film of tungsten nitride, molybdenum nitride, and/or titanium nitride may be used as the conductive film 1609, and a single layer or a stacked film of tantalum, molybdenum, and/or titanium may be used as the conductive film 1610.

Figure 17A:
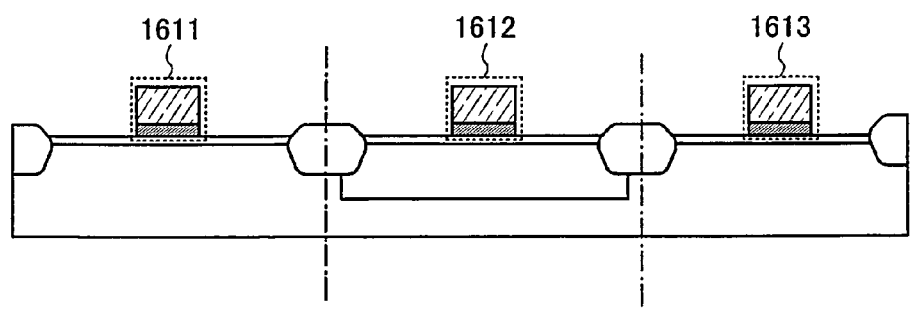
FIGS. 17A to 17C illustrate an exemplary method of fabricating a semiconductor device of the invention.

Next, the conductive films 1609 and 1610 that are stacked are selectively removed by etching, whereby the conductive films 1609 and 1610 remain above part of the regions 1602 to 1604. Thus, gate electrodes 1611 to 1613 are formed (FIG. 17A).

Figure 17B:
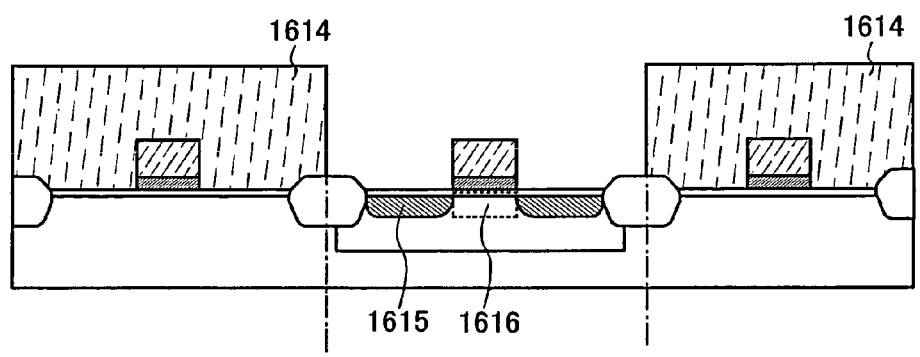

Next, resist masks 1614 are selectively formed so as to cover the regions 1602 and 1604. Then, the region 1603 is doped with an impurity element with the resist masks 1614 and the gate electrode 1612 as masks, whereby impurity regions are formed (FIG. 17B). An n-type impurity element or a p-type impurity element is used as the impurity element. Examples of the n-type impurity element include phosphorus (P) and arsenic (As). Examples of the p-type impurity element include boron (B), aluminum (Al), and gallium (Ga). Here, phosphorus (P) is used as the impurity element.

By introducing the impurity element, impurity regions 1615 that form source and drain regions and a channel formation region 1616 are formed in the region 1603 (FIG. 17B).

Figure 17C:
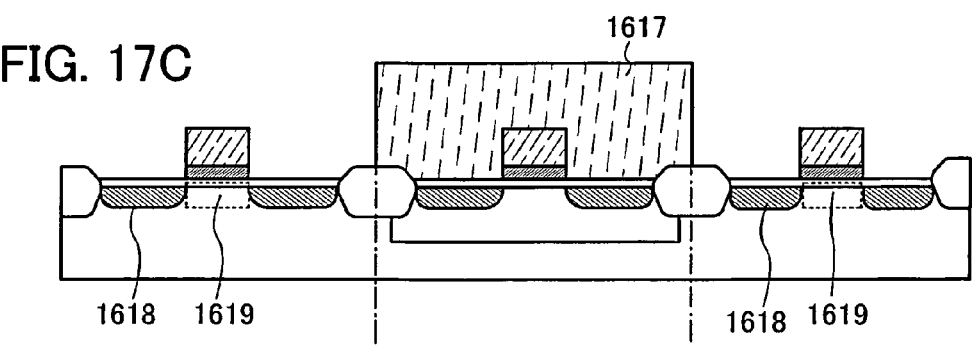

Next, a resist mask 1617 is selectively formed to cover the region 1603, and the regions 1602 and 1604 are doped with an impurity element with the resist mask 1617 and the gate electrodes 1611 and 1613 as masks, whereby impurity regions are formed (FIG. 17C). An n-type impurity element or a p-type impurity element is used as the impurity element. Examples of the n-type impurity element include phosphorus (P) and arsenic (As). Examples of the p-type impurity element include boron (B), aluminum (Al), and gallium (Ga). Here, an impurity element (for example, boron (B)) having an opposite conductivity type to the impurity element that has been added to the region 1603 in FIG. 17B is used. As a result, impurity regions 1618 that form source and drain regions and channel formation regions 1619 are formed in the regions 1602 and 1604.

Figure 18:
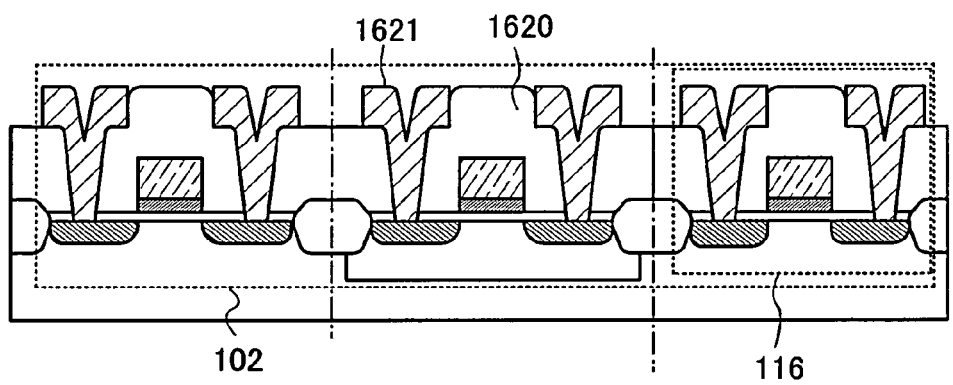
FIG. 18 illustrates an exemplary method of fabricating a semiconductor device of the invention.

Next, a second insulating film 1620 is formed to cover the insulating films 1606 to 1608 and the gate electrodes 1611 to 1613 (FIG. 18). Then, wirings 1621 are formed over the second insulating film 1620 to be electrically connected to the impurity regions 1615 and 1618 that are formed in the regions 1602 to 1604, respectively.

The second insulating film 1620 can be formed either in a single layer or stacked layers by a chemical vapor deposition (CVD) method, a sputtering method, or the like, using an insulating material containing oxygen or nitrogen, such as silicon oxide ($SiO_x$), silicon nitride ($SiN_x$), silicon oxynitride ($SiO_xN_y$) (x>y>0), or silicon nitride oxide ($SiN_xO_y$) (x>y>0); a film containing carbon such as DLC (diamond-like carbon); an organic material such as epoxy, polyimide, polyamide, polyvinyl phenol, benzocyclobutene, or acrylic; or a siloxane material such as a siloxane resin. Note that a siloxane material is a material having a Si—O—Si bond. Siloxane has a skeletal structure with the bond of silicon (Si) and oxygen (O). As a substituent of siloxane, an organic group containing at least hydrogen (e.g., an alkyl group or an aryl group) is used. A fluoro group may also be used as the substituent. Alternatively, both an organic group containing at least hydrogen and a fluoro group may be used as the substituent.

The wiring 1621 is formed either in a single layer or stacked layers by a chemical vapor deposition (CVD) method, a sputtering method, or the like, using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or compound material containing such an element as a main component. An alloy material containing aluminum as a main component is, for example, an alloy material which contains aluminum as a main component and contains nickel, or an alloy material which contains aluminum as a main component and contains one or both of carbon and silicon. The wiring 1621 preferably has a stacked-layer structure of, for example, a barrier film, an aluminum silicon (Al—Si) film, and a barrier film, or a stacked-layer structure of a barrier film, an aluminum silicon (Al—Si) film, a titanium nitride film, and a barrier film. Note that the barrier film corresponds to a thin film made of titanium, titanium nitride, molybdenum, or molybdenum nitride. Aluminum and aluminum silicon, which have low resistance values and are inexpensive, are the most suitable materials for forming the wiring 1621. When barrier layers are provided as the top layer and the bottom layer of the wiring 1621, generation of hillock of aluminum or aluminum silicon can be prevented. Further, when a barrier film made of titanium that is an element having a high reducing property is formed, even when there is a thin natural oxide film formed on the crystalline semiconductor film, the natural oxide film can be reduced, so that the wiring 1621 can form a favorable contact with the crystalline semiconductor film.

Note that the structures of the transistors are not limited to those described above, and an inversely staggered structure, a Fin-FET structure, or the like may also be used. The Fin-FET structure can suppress a short-channel effect that would occur in accordance with miniaturization of transistors.

The charging circuit 116 illustrated in the above embodiment mode and Embodiments 1 and 2 can be constructed with the transistor formed in the region 1604. In addition, the signal processing circuit 102 illustrated in the embodiment mode and Embodiments 1 and 2 can be constructed with the transistors formed in the regions 1602 to 1604. Note that the electric double layer capacitor 104 can be formed above the transistors that are formed in the regions 1602 to 1604 as in Embodiments 1 and 2.

Furthermore, by polishing the semiconductor substrate 1600, MOS transistors on a thin single-crystalline substrate can be fabricated.

This embodiment can be combined as appropriate with any of the embodiment mode and other embodiments.

[Embodiment 4]

This embodiment will describe a method of fabricating transistors included in a semiconductor device of the invention, which differs from that described in Embodiment 3, with reference to partial cross-sectional views in FIGS. 19A to 19C, 20A to 20C, 21A to 21C, and 22A and 22B.

Figure 19A:
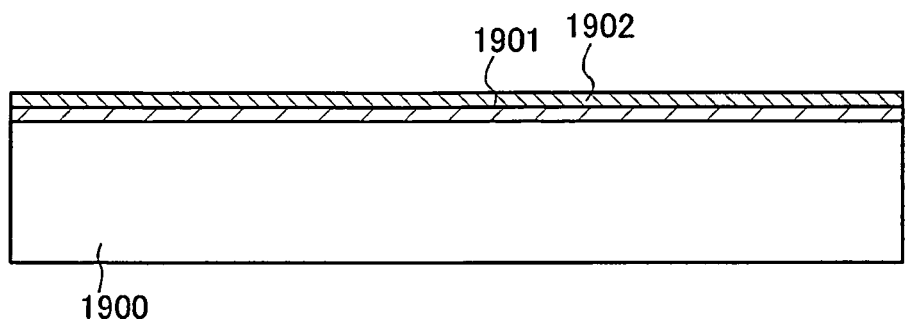
FIGS. 19A to 19C illustrate an exemplary method of fabricating a semiconductor device of the invention.

First, an insulating film is formed over a substrate 1900 (FIG. 19A). Here, single-crystalline Si having n-type conductivity is used for the substrate 1900, and an insulating film 1901 and an insulating film 1902 are formed over the substrate 1900. For example, a silicon oxide ($SiO_x$) film is formed as the insulating film 1901 by applying thermal treatment to the substrate 1900, and then a silicon nitride ($SiN_x$) film is deposited over the insulating film 1901 by a chemical vapor deposition (CVD) method.

The substrate 1900 may be any substrate as long as it is a semiconductor substrate. For example, a single-crystalline Si substrate having n-type conductivity or p-type conductivity, a compound semiconductor substrate (a GaAs substrate, an InP substrate, a GaN substrate, a SiC substrate, a sapphire substrate, a ZnSe substrate, or the like), an SOI (silicon on insulator) substrate formed by a bonding method or a SIMOX (separation by implanted oxygen) method, or the like can be used.

The insulating film 1902 may also be formed by, after the formation of the insulating film 1901, nitriding the insulating film 1901 by high-density-plasma treatment. Note that the insulating film provided over the substrate 1900 may have either a single-layer structure or a stacked-layer structure of more than two layers.

Figure 19B:
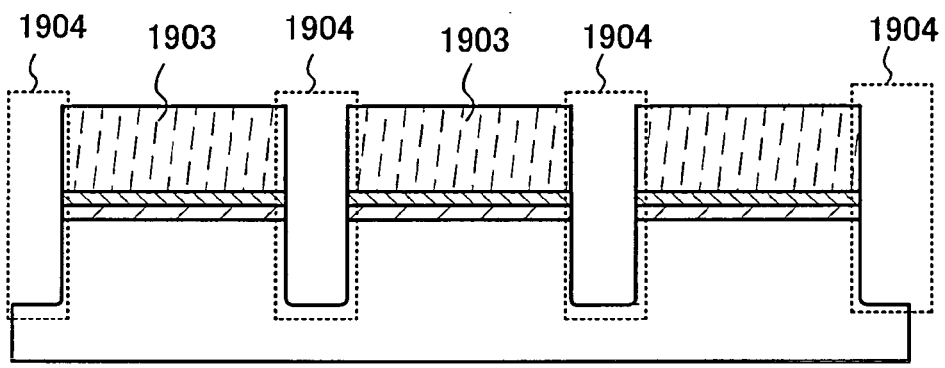

Next, patterns of resist masks 1903 are selectively formed over the insulating film 1902, and selective etching is conducted with the resist masks 1903 as masks (FIG. 19B). Accordingly, recess portions 1904 are selectively formed in the substrate 1900. For etching the substrate 1900 and the insulating films 1901 and 1902, plasma dry etching may be used.

Figure 19C:
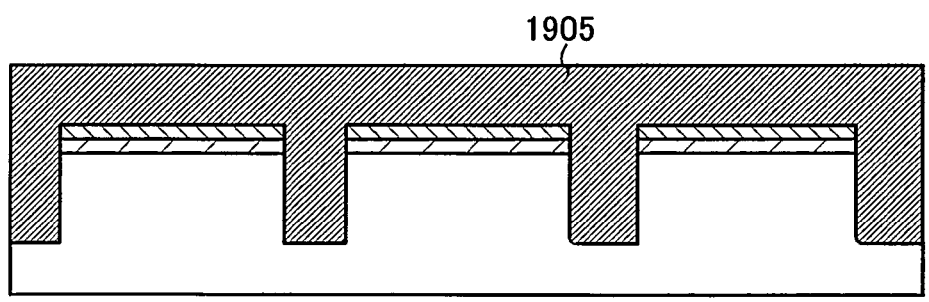

Next, the patterns of the resist masks 1903 are removed, and an insulating film 1905 is formed to fill the recess portions 1904 of the substrate 1900 (FIG. 19C).

The insulating film 1905 is formed by a chemical vapor deposition (CVD) method, a sputtering method, or the like using an insulating material such as silicon oxide, silicon nitride, silicon oxynitride ($SiO_xN_y$) (x>y>0), or silicon nitride oxide ($SiN_xO_y$) (x>y>0). Here, a silicon oxide film is deposited as the insulating film 1905 by an atmospheric pressure CVD method or a low pressure CVD method, using a TEOS (tetraethoxysilane) gas.

Figure 20A:
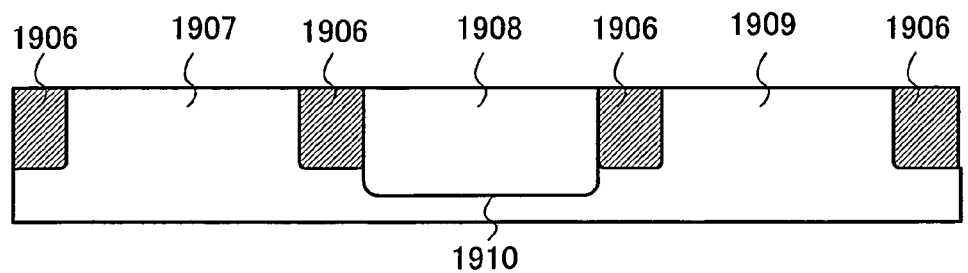
FIGS. 20A to 20C illustrate an exemplary method of fabricating a semiconductor device of the invention.

Next, grinding treatment, polishing treatment, or CMP (chemical mechanical polishing) treatment is applied to expose the surface of the substrate 1900 (FIG. 20A). Here, the surface of the substrate 1900 is exposed so that regions 1907 to 1909 are provided between insulating films 1906 that are formed in the recess portions 1904 of the substrate 1900. Note that the insulating films 1906 are obtained by removing part of the insulating film 1905 formed over the surface of the substrate 1900 by a grinding treatment, polishing treatment, or CMP (chemical mechanical polishing) treatment. Next, a p-type impurity element is selectively introduced to form a p well 1910 in the region 1908.

Examples of the p-type impurity element include boron (B), aluminum (Al), and gallium (Ga). Here, boron (B) is used as the impurity element to form the region 1908.

Note that in this embodiment, the regions 1907 and 1909 are not doped with an impurity element because an n-type semiconductor substrate is used as the substrate 1900. However, n wells may be formed in the regions 1907 and 1909 by doping them with an n-type impurity element. Examples of the n-type impurity element include phosphorus (P) and arsenic (As).

Meanwhile, when a p-type semiconductor substrate is used, n wells may be formed by doping the regions 1907 and 1909 with an n-type impurity element and not doping the region 1908 with an impurity element.

Figure 20B:
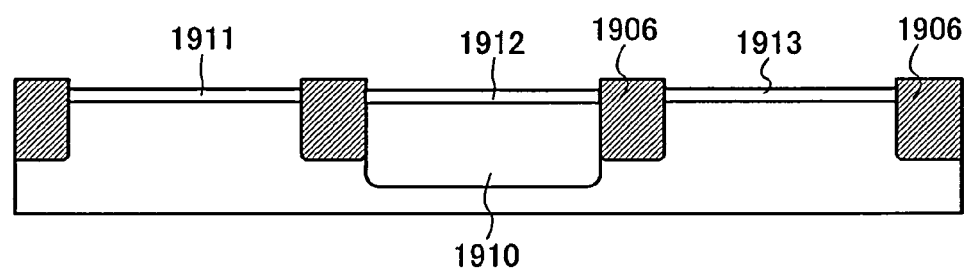

Next, insulating films 1911 to 1913 are formed to cover the regions 1907 to 1909, respectively, of the substrate 1900 (FIG. 20B).

The insulating films 1911 to 1913 can be formed using, for example, silicon oxide films that are obtained by oxidizing the surfaces of the regions 1907 to 1909 provided in the semiconductor substrate 1900 by thermal treatment. Further, after the formation of the silicon oxide films by thermal oxidation, the surfaces of the silicon oxide films may be nitrided by nitridation treatment, so that a stacked-layer structure of a silicon oxide film and a film containing oxygen and nitrogen (a silicon oxynitride film) can be formed.

Further, the insulating films 1911 to 1913 can also be formed by plasma treatment as described above. For example, by applying high-density-plasma oxidation treatment or high-density-plasma nitridation treatment to the surfaces of the regions 1907 to 1909 provided in the substrate 1900, silicon oxide (SiO$_x$) films or silicon nitride (SiN$_x$) films can be formed as the insulating films 1911 to 1913. Further, after oxidizing the surfaces of the regions 1907 to 1909 by high-density-plasma oxidation treatment, high-density-plasma nitridation treatment may be applied. In this case, silicon oxide films are formed on the surfaces of the regions 1907 to 1909, and silicon oxynitride films are formed on the silicon oxide films. Therefore, each of the insulating films 1911 to 1913 has a stack of a silicon oxide film and a silicon oxynitride film. In addition, after the formation of the silicon oxide films on the surfaces of the regions 1907 to 1909 by thermal oxidation, high-density-plasma oxidation treatment or high-density-plasma nitridation treatment may be applied.

Note that the insulating films 1911 to 1913 that are formed in the regions 1907 to 1909, respectively, of the substrate 1900 function as gate insulating films of transistors to be completed in subsequent steps.

Figure 20C:
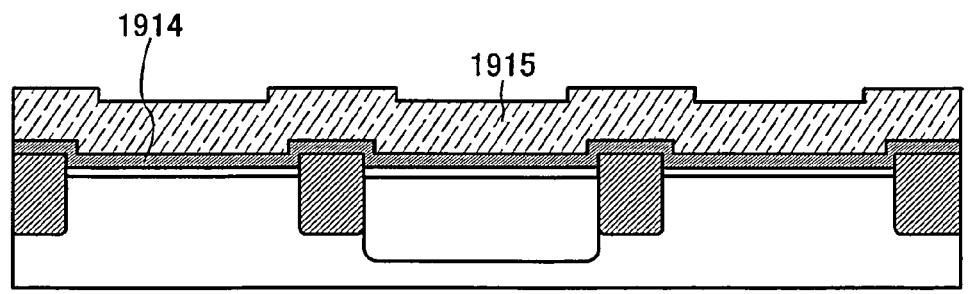

Next, a conductive film is formed to cover the insulating films 1911 to 1913 that are formed above the regions 1907 to 1909 provided in the substrate 1900 (FIG. 20C). Here, an example is shown in which the conductive film is formed by sequentially stacking a conductive film 1914 and a conductive film 1915. Needless to say, the conductive film may have a single-layer structure or a stacked-layer structure of more than two layers.

The conductive films 1914 and 1915 can be formed using an element selected from tantalum (Ta), tungsten (W), titanium (Ti), molybdenum (Mo), aluminum (Al), copper (Cu), chromium (Cr), niobium (Nb), or the like, or an alloy material or compound material containing such an element as a main component. Alternatively, a metal nitride film that is formed by nitriding the above element may be used. As a further alternative, a semiconductor film typified by polycrystalline silicon doped with an impurity element such as phosphorus or the like may be used.

Here, tantalum nitride is deposited as the conductive film 1914, and tungsten is stacked thereover as the conductive film 1915. Alternatively, a single layer or a stacked film of tantalum nitride, tungsten nitride, molybdenum nitride, and/or titanium nitride may be used as the conductive film 1914, and a single layer or a stacked film of tungsten, tantalum, molybdenum, and/or titanium may be used as the conductive film 1915.

Figure 21A:
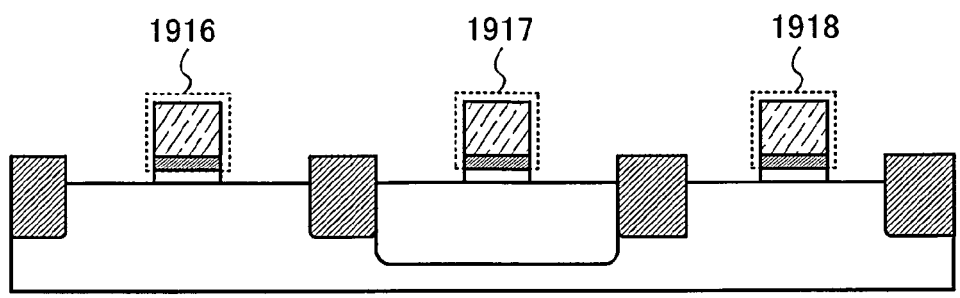
FIGS. 21A to 21C illustrate an exemplary method of fabricating a semiconductor device of the invention.

Next, the conductive films 1914 and 1915 that are stacked are selectively removed by etching, whereby the conductive films 1914 and 1915 remain above part of the regions 1907 to 1909 of the substrate 1900 (FIG. 21A). Thus, conductive films 1916 to 1918 that function as gate electrodes are formed (FIG. 21A). Here, part of the surfaces of the regions 1907 to 1909 in the substrate 1900, which does not overlap with the conductive films 1916 to 1918, is exposed.

Specifically, in the region 1907 of the substrate 1900, part of the insulating film 1911 formed below the conductive film 1916, which does not overlap with the conductive film 1916, is selectively removed so that end portions of the conductive film 1916 correspond to end portions of the insulating film 1911. Similarly, in the region 1908, part of the insulating film 1912 formed below the conductive film 1917, which does not overlap with the conductive film 1917, is selectively removed so that end portions of the conductive film 1917 correspond to end portions of the insulating film 1912. Also, in the region 1909, part of the insulating film 1913 formed below the conductive film 1918, which does not overlap with the conductive film 1918, is selectively removed so that end portions of the conductive film 1918 correspond to end portions of the insulating film 1913.

In this case, the part of the insulating films which does not overlap with the conductive films 1916 to 1918 may be removed either at the same time as the formation of the conductive films 1916 to 1918 or after the formation of the conductive films 1916 to 1918. In the latter case, resist masks or the conductive films 1916 to 1918 are used as masks.

Figure 21B:
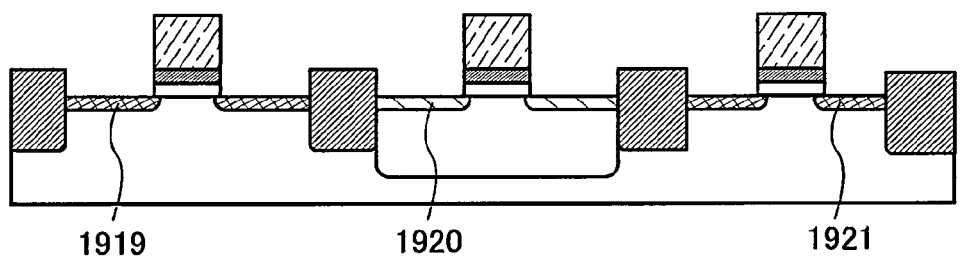

Next, the regions 1907 to 1909 of the substrate 1900 are selectively doped with an impurity element (FIG. 21B). Here, the region 1908 is selectively doped with an n-type impurity element with the conductive film 1917 as a mask so that the region 1908 contains the n-type impurity element at a low concentration. Accordingly, impurity regions 1920 are formed. Meanwhile, the regions 1907 and 1909 are doped with a p-type impurity element with the conductive films 1916 and 1918 as masks so that the regions 1907 and 1909 contain the p-type impurity element at a low concentration. Accordingly, impurity regions 1919 and 1921 are formed. Examples of the n-type impurity element include phosphorus (P) and arsenic (As). Examples of the p-type impurity element include boron (B), aluminum (Al), and gallium (Ga).

Next, sidewalls 1922 that are in contact with the side surfaces of the conductive films 1916 to 1918 are formed. Specifically, a film containing an inorganic material such as silicon, silicon oxide, or silicon nitride, or a film containing an organic material such as an organic resin is deposited either in a single layer or stacked layers by a plasma CVD method, a sputtering method, or the like. Then, the insulating film is selectively etched by anisotropic etching (etching mainly in a perpendicular direction), so that the resultant insulating films can be in contact with the side surfaces of the conductive films 1916 to 1918. Note that the sidewalls 1922 are used as doping masks for formation of LDD (lightly doped drain) regions. Here, the sidewalls 1922 are also formed to be in contact with the insulating films 2001 to 2003 that are formed below the conductive films 1916 to 1918.

Figure 21C:
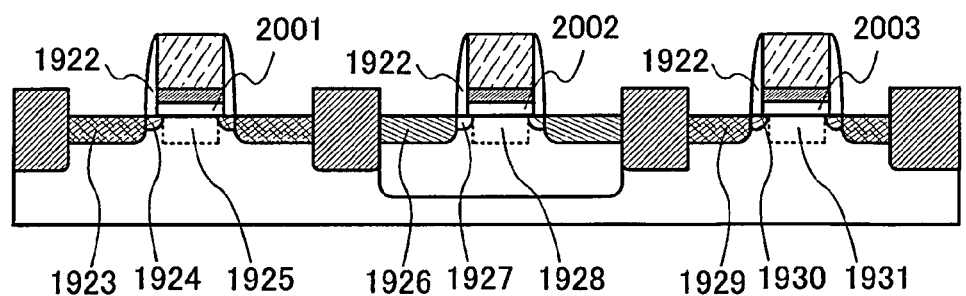

Next, the regions 1907 to 1909 of the substrate 1900 are doped with an impurity element with the sidewalls 1922 and the conductive films 1916 to 1918 as masks, so that impurity regions functioning as source and drain regions are formed (FIG. 21C). Here, the region 1908 of the substrate 1900 is doped with an n-type impurity element with the sidewalls 1922 and the conductive film 1917 as masks so that the region 1908 contains the n-type impurity element at a high concentration. Also, the regions 1907 and 1909 are doped with a p-type impurity element with the sidewalls 1922 and the conductive films 1916 and 1918 as masks so that the regions 1907 and 1909 contain the p-type impurity element at a high concentration.

Consequently, impurity regions 1923 that form source and drain regions, low-concentration impurity regions 1924 that form LDD regions, and a channel formation region 1925 are formed in the region 1907 of the substrate 1900. Similarly, impurity regions 1926 that form source and drain regions, low-concentration impurity regions 1927 that form LDD regions, and a channel formation region 1928 are formed in the region 1908 of the substrate 1900. Also, impurity regions 1929 that form source and drain regions, low-concentration impurity regions 1930 that form LDD regions, and a channel formation region 1931 are formed in the region 1909 of the substrate 1900.

Note that in this embodiment, impurity elements are introduced with part of the regions 1907 to 1909 of the substrate 1900, which does not overlap with the conductive films 1916 to 1918, being exposed. Therefore, the channel formation regions 1925, 1928, and 1931 that are formed in the regions 1907 to 1909, respectively, of the substrate 1900 can be formed in a self-aligned manner by utilizing the conductive films 1916 to 1918.

Figure 22A:
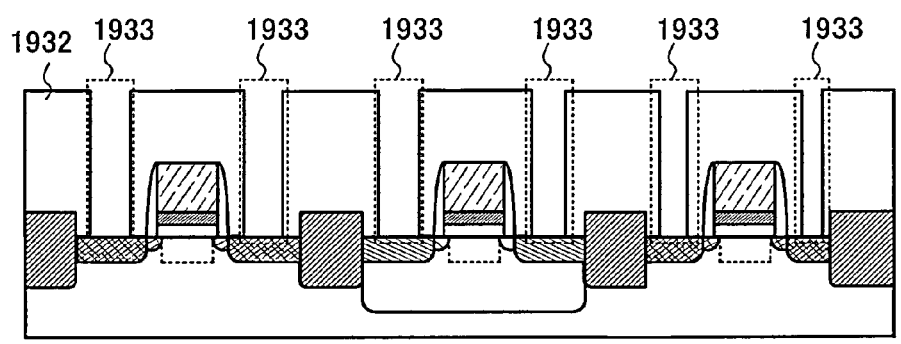
FIGS. 22A and 22B illustrate an exemplary method of fabricating a semiconductor device of the invention.

Next, a second insulating film 1932 is formed to cover the insulating films, the conductive films, and the like that are formed above the regions 1907 to 1909 of the substrate 1900 (FIG. 22A). Then, openings 1933 are formed in the second insulating film 1932.

The second insulating film 1932 can be formed either in a single layer or stacked layers by a chemical vapor deposition (CVD) method, a sputtering method, or the like, using an insulating material containing oxygen or nitrogen, such as silicon oxide ($SiO_x$), silicon nitride ($SiN_x$), silicon oxynitride ($SiO_xN_y$) (x>y>0), or silicon nitride oxide ($SiN_xO_y$) (x>y>0); a film containing carbon such as DLC (diamond-like carbon); an organic material such as epoxy, polyimide, polyamide, polyvinyl phenol, benzocyclobutene, or acrylic; or a siloxane material such as a siloxane resin. Note that a siloxane material is a material having a Si—O—Si bond. Siloxane has a skeletal structure with the bond of silicon (Si) and oxygen (O). As a substituent of siloxane, an organic group containing at least hydrogen (e.g., an alkyl group or an aryl group) is used. A fluoro group may also be used as the substituent. Alternatively, both an organic group containing at least hydrogen and a fluoro group may be used as the substituent.

Figure 22B:
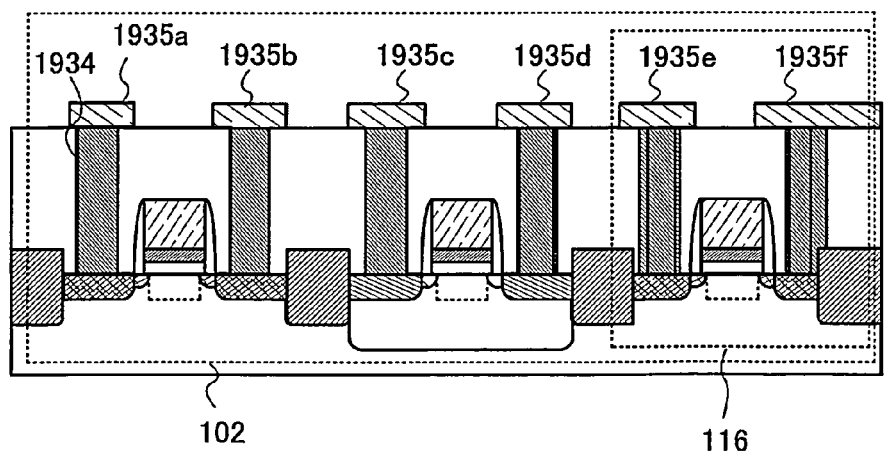

Next, as illustrated in FIG. 22B, conductive films 1934 are formed in the openings 1933 by a chemical vapor deposition (CVD) method, and conductive films 1935*a* to 1935*f* are selectively formed over the insulating film 1932 to be electrically connected to the conductive films 1934.

Each of the conductive films 1934 and 1935*a* to 1935*f* is formed either in a single layer or stacked layers by a chemical vapor deposition (CVD) method, a sputtering method, or the like, using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or compound material containing such an element as a main component. An alloy material containing aluminum as a main component is, for example, an alloy material which contains aluminum as a main component and contains nickel, or an alloy material which contains aluminum as a main component and contains one or both of carbon and silicon. Each of the conductive films 1934 and 1935*a* to 1935*f* preferably has a stacked-layer structure of, for example, a barrier film, an aluminum silicon (Al—Si) film, and a barrier film, or a stacked-layer structure of a barrier film, an aluminum silicon (Al—Si) film, a titanium nitride film, and a barrier film. Note that the barrier film corresponds to a thin film made of titanium, titanium nitride, molybdenum, or molybdenum nitride. Aluminum and aluminum silicon, which have low resistance values and are inexpensive, are the most suitable materials for forming the conductive film 1934. When barrier layers are provided as the top layer and the bottom layer of the conductive film 1934, generation of hillock of aluminum or aluminum silicon can be prevented. Further, when a barrier film made of titanium that is an element having a high reducing property is formed, even when there is a thin natural oxide film formed on the crystalline semiconductor film, the natural oxide film can be reduced, so that the conductive film 1934 can form a favorable contact with the crystalline semiconductor film. Here, the conductive film 1934 can be formed by selectively growing tungsten (W) by a chemical vapor deposition (CVD) method.

Through the above steps, a semiconductor device, which has p-channel transistors formed in the regions 1907 and 1909 of the substrate 1900 and has an n-channel transistor formed in the region 1908, can be obtained.

Note that the structures of the transistors are not limited to those described above, and an inversely staggered structure, a Fin-FET structure, or the like may also be used. The Fin-FET structure can suppress a short-channel effect that would occur in accordance with miniaturization of transistors.

The charging circuit 116 illustrated in the embodiment mode and Embodiments 1 and 2 can be constructed with the transistor formed in the region 1909. In addition, the signal processing circuit 102 illustrated in the embodiment mode and Embodiments 1 and 2 can be constructed with the transistors formed in the regions 1907, 1908, and 1909. Note that the electric double layer capacitor 104 can be formed above the transistors that are formed in the regions 1907 to 1909 as in Embodiments 1 and 2.

Furthermore, by polishing the semiconductor substrate 1900, MOS transistors on a thin single-crystalline substrate can be fabricated.

This embodiment can be combined as appropriate with any of the embodiment mode and other embodiments.

[Embodiment 5]

This embodiment will describe examples of the application of RFID as exemplary uses of the semiconductor devices that are fabricated in accordance with Embodiments 1 to 4. RFID has a wide range of applications, such as bills, coins, securities, bearer bonds, documents (e.g., driver's licenses or resident's cards), packaging containers (e.g., wrapping paper or bottles), storage media (e.g., DVD software or video tapes), means of transportation (e.g., bicycles), personal belongings (e.g., shoes or glasses), foods, plants, animals, human bodies, clothing, everyday articles, or tags on goods such as electronic appliances or on bags. RFID can be used as a so-called ID label, ID tag, or ID card. An electronic appliance is, for example, a liquid crystal display device, an EL display device, a television device (also referred to as simply a television, or as a TV receiver or a television receiver), a portable telephone, or the like. Examples of the application of the invention, and goods to which the invention is applied will be described with reference to FIGS. 23A to 23E.

Figure 23A:
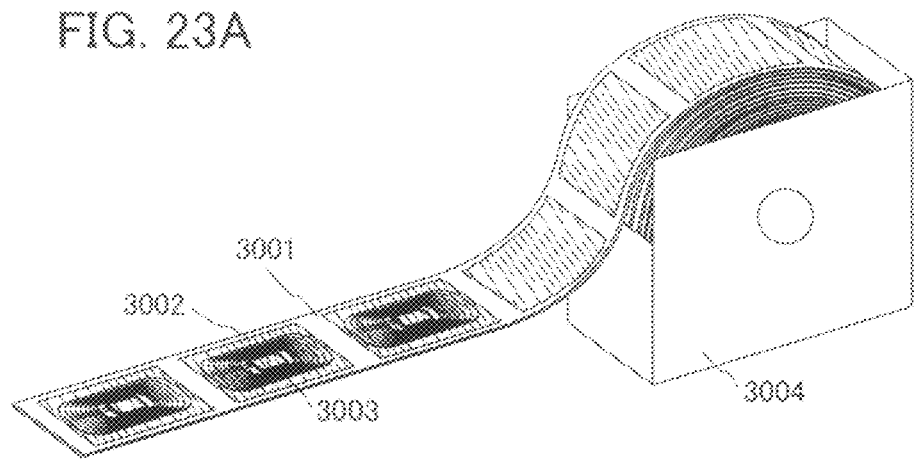
FIGS. 23A to 23E illustrate examples of the application of a semiconductor device of the invention.

FIG. 23A shows examples of completed products including RFID of the invention. A plurality of ID labels 3003 each including an RFID 3002 are formed on a label board (separate paper) 3001. The ID labels 3003 are stored in a box 3004. In addition, on the ID label 3003, information about a product or service (a name of the product, brand, trademark, trademark owner, seller, manufacturer, or the like) is written, while an ID number that is unique to the product (or the type of the product) is assigned to the included RFID to make it possible to easily detect forgery, infringement of intellectual property rights such as patent rights and trademark rights, and illegality such as unfair competition. In addition, a large amount of information that cannot be clearly written on a container of the product or the label (for example, the production area, selling area, quality, raw material, efficacy, use, quantity, shape, price, production method, usage, time of the production, time of use, expiration date, instructions for the product, information about the intellectual property of the product, or the like) can be input to the RFID so that a client or a consumer can access the information by using a simple reader. Further, the RFID is structured such that the producer of a product can easily rewrite or erase information, for example, but a client or a consumer cannot. Note that the RFID may be provided with a display portion to display such information.

Figure 23B:
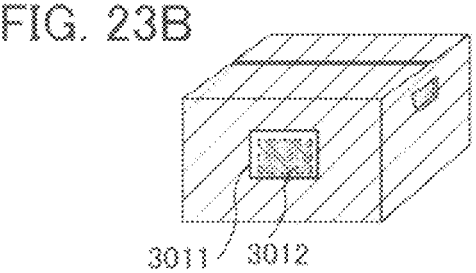

FIG. 23B shows a label-shaped RFID tag 3011 including an RFID 3012. By providing a product with the RFID 3011, management of the product can be simplified. For example, in the case where a product is stolen, the product can be traced, so the culprit can be identified quickly. Thus, by providing the RFID, products that are superior in so-called traceability can be distributed.

Figure 23C:
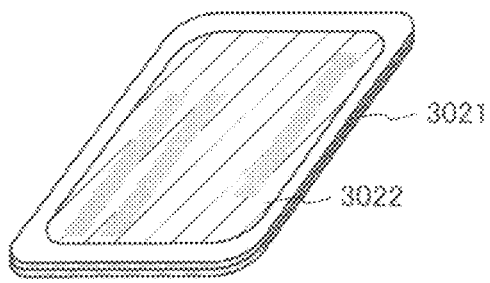

FIG. 23C shows an example of a completed ID card 3021 including an RFID 3022 of the invention. The ID card 3021 may be any kind of card, including a cash card, a credit card, a prepaid card, an electronic ticket, electronic money, a telephone card, and a membership card. In addition, the ID card 3021 may be provided with a display portion to display various information.

Figure 23D:
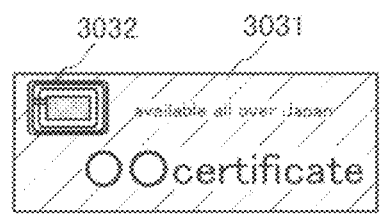

FIG. 23D shows an example of a completed bearer bond 3031. An RFID 3032 is embedded in the bearer bond 3031 and is protected by a resin which forms the periphery of the semiconductor device. Here, the resin is filled with fillers. The bearer bond 3031 can be formed in the same manner as an RFID of the invention. Note that examples of the bearer bond include, but not limited to, stamps, tickets, admission tickets, merchandise coupons, book coupons, stationery coupons, beer coupons, rice coupons, various types of gift coupons, and various types of service coupons. In addition, when the RFID 3032 of the invention is provided in bills, coins, securities, bearer bonds, documents, or the like, an authentication function can be provided. Therefore, by using the authentication function, forgery can be prevented.

Figure 23E:
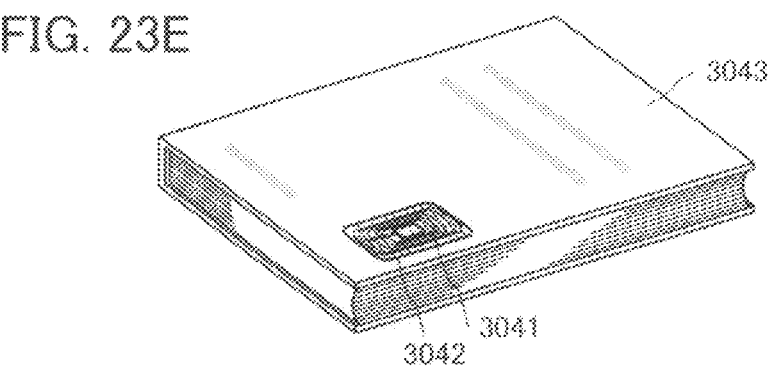

FIG. 23E shows a book 3043 to which an ID label 3041 including an RFID 3042 is attached. The RFID 3042 of the invention is firmly attached in or on goods by being attached to a surface or embedded therein, for example. As shown in FIG. 23E, the RFID 3042 can be embedded in the paper of a book, or embedded in an organic resin of a package. Since the RFID 3042 of the invention can be small, thin, and lightweight, it can be firmly attached to or in goods without spoiling their design.

In addition, the efficiency of a system such as an inspection system can be improved by provision of the RFID of the invention in, for example, packaging containers, storage media, personal belongings, foods, clothing, everyday articles, electronic appliances, or the like, although this is not illustrated here. Further, by providing the RFID on or in a vehicle, counterfeit and theft can be prevented. Living things such as animals can be easily identified by implanting the individual living things with the RFID. For example, year of birth, sex, breed, or the like can be easily discerned by implanting the RFID in living things such as domestic animals.

Figure 24A:
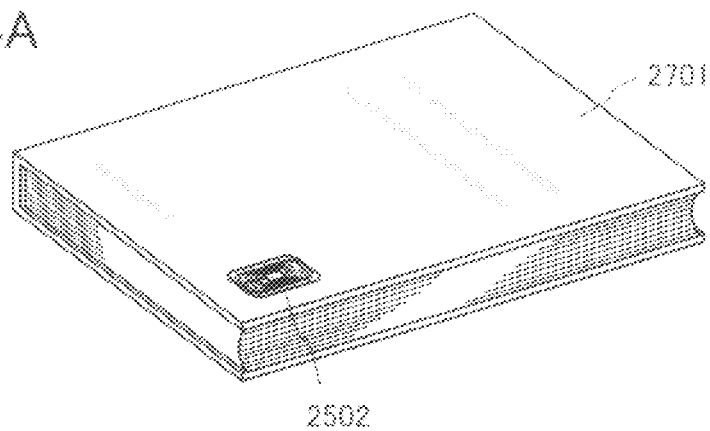
FIGS. 24A to 24D illustrate examples of the application of a semiconductor device of the invention.
Figure 24B:
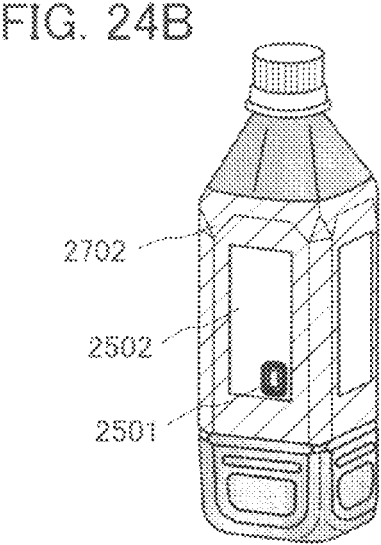

FIGS. 24A and 24B show a book 2701 and a plastic bottle 2702, respectively, to which an ID label 2502 including an RFID of the invention is attached. The ID label that is used in the invention is quite thin; therefore, when the ID label is mounted on goods such as the book, the function or design is not spoiled. Furthermore, in the case of a non-contact type thin film integrated circuit device, an antenna and a chip can be integrally formed to make it easier to transfer the non-contact type thin film integrated circuit device directly to a product with a curved surface.

Figure 24C:
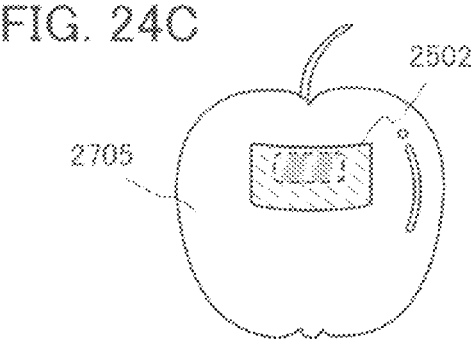
Figure 24D:
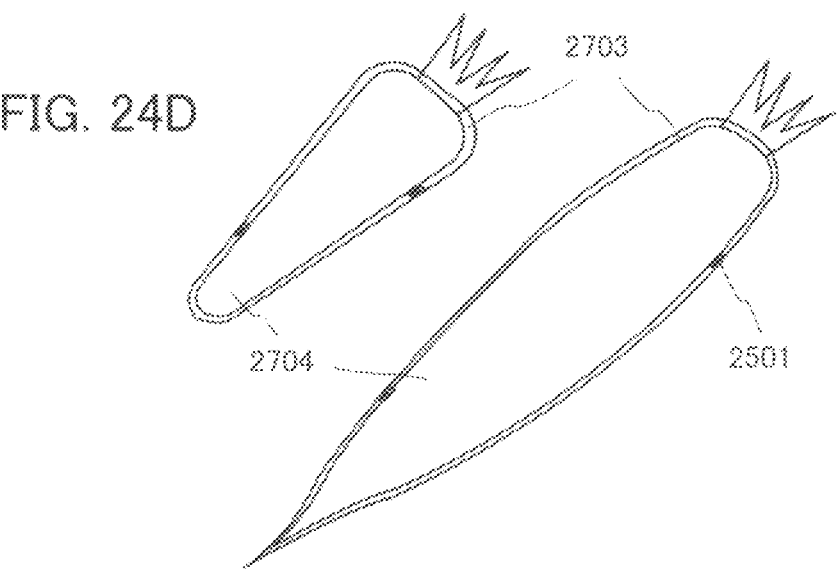
Figure 25:
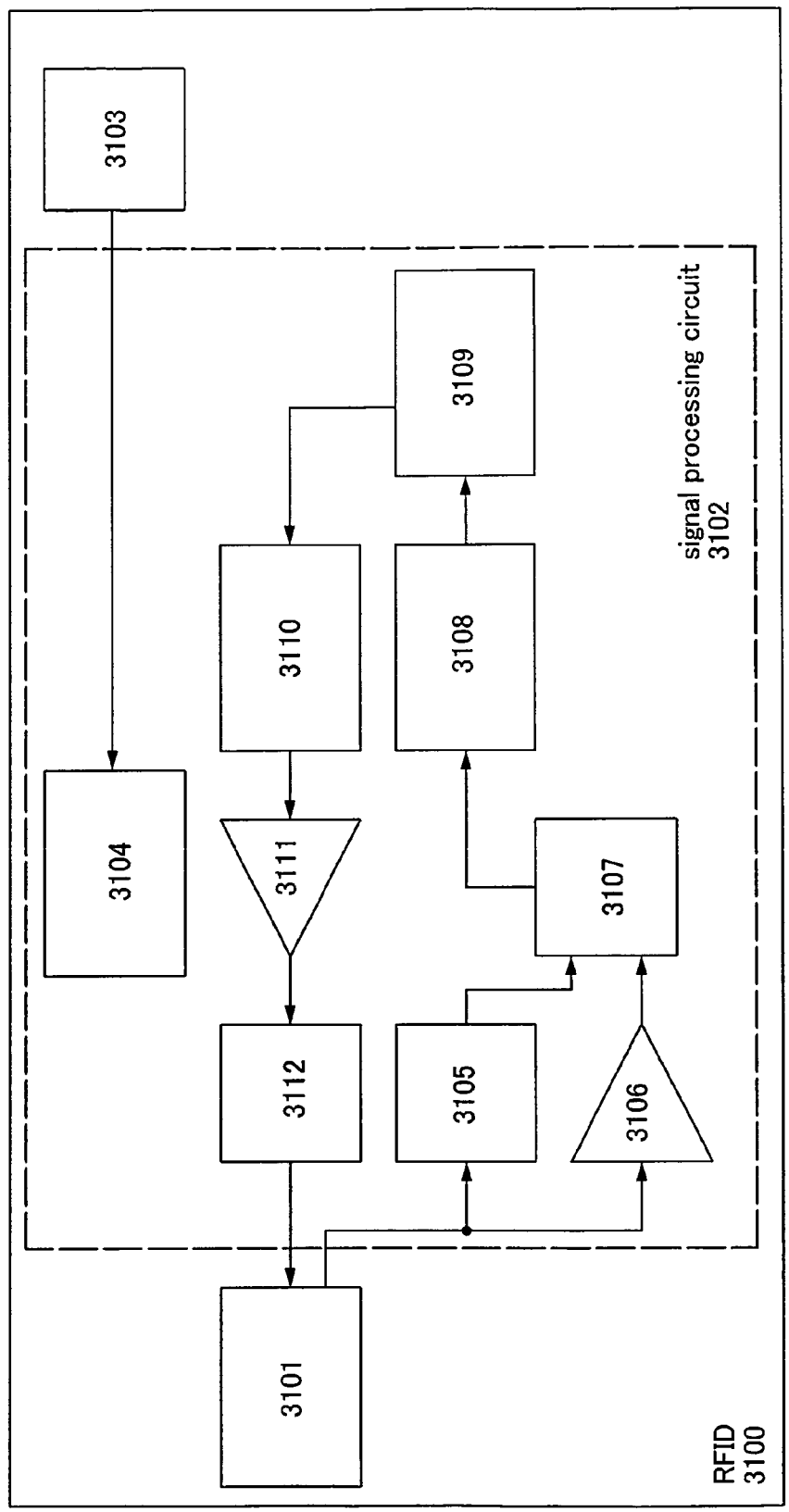
FIG. 25 illustrates a specific structure of an active-type RFID.
Figure 26:
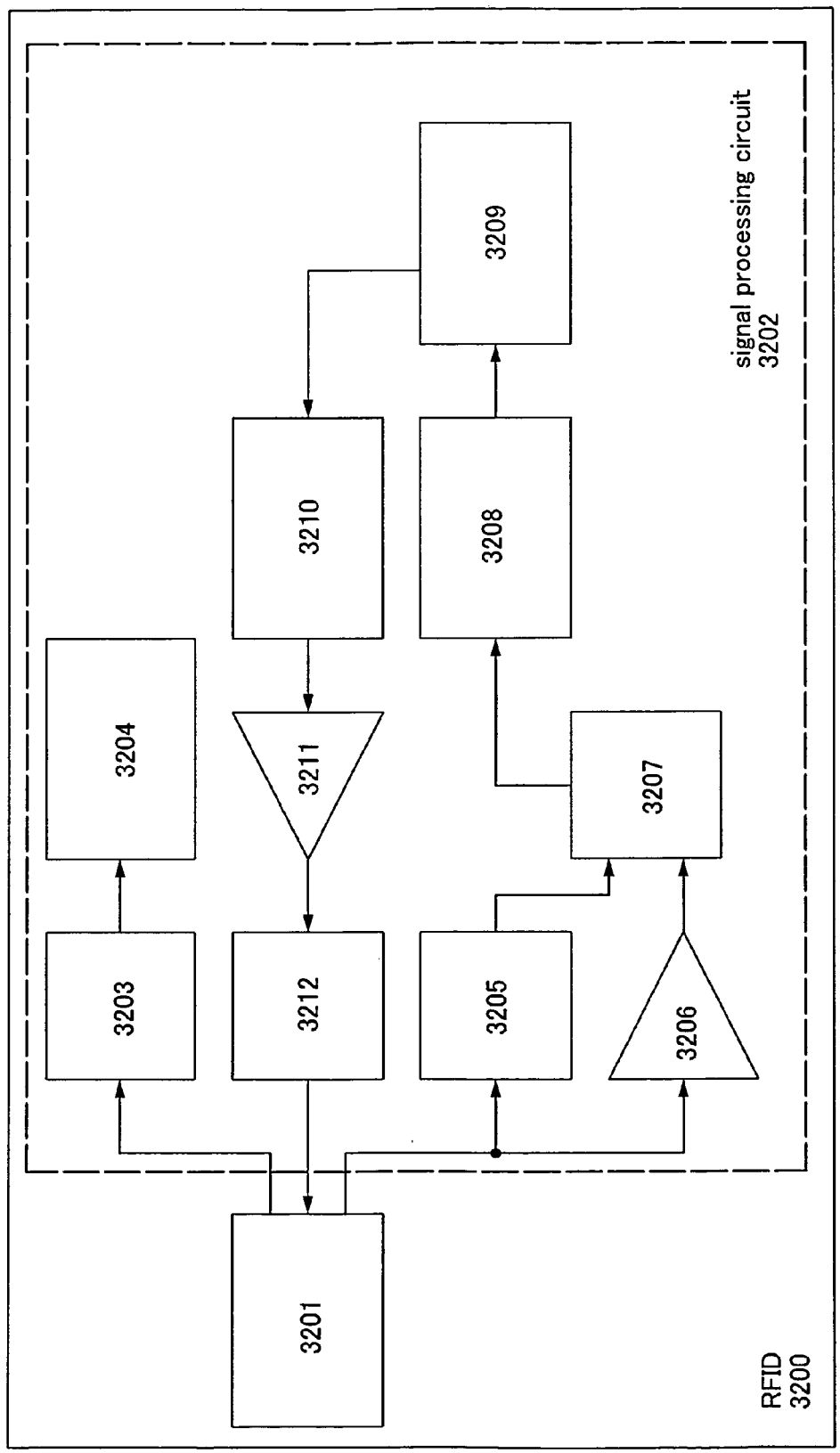
FIG. 26 illustrates a specific structure of a passive-type RFID.

FIG. 24C shows an example in which the ID label 2502 including an RFID is directly attached to a fresh food such as a fruit 2705. In addition, FIG. 24D shows an example in which fresh foods such as vegetables 2704 are each wrapped in a wrapping film 2703. When the semiconductor device of the invention is attached to the fruit 2705 or the vegetables 2704 having a curved surface, bending stress exerted on the wiring that connects the electric double layer capacitor and the signal processing circuit is small. Therefore, breaking of the wiring can be prevented. In addition, when a chip 2501 is attached to a product, there is a possibility that the chip is peeled off. However, when the product is wrapped in the wrapping film 2703, it is difficult to peel off the wrapping film 2703, which brings some merit for security.

Note that the semiconductor device of the invention can be used for various products in addition to the aforementioned products.

This embodiment can be combined as appropriate with any of the embodiment mode and other embodiments.

The present application is based on Japanese Priority Application No. 2006-353336 filed on Dec. 27, 2006 with the Japanese Patent Office, the entire contents of which are hereby incorporated by reference.

What is claimed is:

1. A semiconductor device comprising:
a signal processing circuit having a charging circuit;
an insulating film over the signal processing circuit;
a first conductive layer over the insulating film;
a second conductive layer over the insulating film; and
an electric double layer capacitor over the insulating film, wherein:
the second conductive layer is electrically connected to the signal processing circuit,
the electric double layer capacitor is directly connected to the charging circuit,
the charging circuit is configured to charge the electric double layer capacitor,
the charging circuit includes a regulator for controlling voltage and a diode having a rectification property,
the second conductive layer is configured to receive a wireless signal,
the first conductive layer and the electric double layer capacitor are provided over and in direct contact with a surface of the insulating film, and
the second conductive layer is provided over and in direct contact with the first conductive layer and the surface of the insulating film.

2. The semiconductor device according to claim 1, wherein the electric double layer capacitor is positioned to overlap with the charging circuit.

3. The semiconductor device according to claim 1, wherein:
the electric double layer capacitor includes at least a first electrode, a second electrode, and an electrolyte solution layer between the first electrode and the second electrode,
the first electrode is electrically connected to the charging circuit, and
a layer made of a material selected from the group consisting of activated carbon, fullerene, and carbon nanotube is provided on at least one of the first electrode and the second electrode.

4. The semiconductor device according to claim 1, wherein:
the electric double layer capacitor includes at least a first electrode, a second electrode, and an electrolyte solution layer between the first electrode and the second electrode,
the first electrode is electrically connected to the charging circuit, and
at least one of the first electrode and the second electrode is formed from a material selected from the group consisting of activated carbon, fullerene, and carbon nanotube.

5. The semiconductor device according to claim 1, wherein:
the electric double layer capacitor includes at least a first electrode, a second electrode, and an electrolyte solution layer between the first electrode and the second electrode, and
the electrolyte solution layer includes a separator.

6. A semiconductor device comprising:
a signal processing circuit over a first flexible substrate and having a charging circuit;
an insulating film over the signal processing circuit;
a first conductive layer over the insulating film;
a second conductive layer over the insulating film;
an electric double layer capacitor over the insulating film; and
a second flexible substrate over the second conductive layer and the electric double layer capacitor,
wherein:
the second conductive layer is electrically connected to the signal processing circuit,
the electric double layer capacitor is directly connected to the charging circuit,
the charging circuit is configured to charge the electric double layer capacitor,
the charging circuit includes a regulator for controlling voltage and a diode having a rectification property,
the second conductive layer is configured to receive a wireless signal,
the first conductive layer and the electric double layer capacitor are provided over and in direct contact with a surface of the insulating film, and
the second conductive layer is provided over and in direct contact with the first conductive layer and the surface of the insulating film.

7. The semiconductor device according to claim 6, wherein the electric double layer capacitor is positioned to overlap with the charging circuit.

8. The semiconductor device according to claim 6, wherein:
the electric double layer capacitor includes at least a first electrode, a second electrode, and an electrolyte solution layer between the first electrode and the second electrode,
the first electrode is electrically connected to the charging circuit, and
a layer made of a material selected from the group consisting of activated carbon, fullerene, and carbon nanotube is provided on at least one of the first electrode and the second electrode.

9. The semiconductor device according to claim 6, wherein:
the electric double layer capacitor includes at least a first electrode, a second electrode, and an electrolyte solution layer between the first electrode and the second electrode,
the first electrode is electrically connected to the charging circuit, and
at least one of the first electrode and the second electrode is formed from a material selected from the group consisting of activated carbon, fullerene, and carbon nanotube.

10. The semiconductor device according to claim 6, wherein:
the electric double layer capacitor includes at least a first electrode, a second electrode, and an electrolyte solution layer between the first electrode and the second electrode, and
the electrolyte solution layer includes a separator.

11. A semiconductor device comprising:
a signal processing circuit over a first flexible substrate and having a charging circuit;
an insulating film over the signal processing circuit;
a first conductive layer over the insulating film;
a second conductive layer over the insulating film;
a battery over the insulating film; and
a second flexible substrate over the second conductive layer and the battery,
wherein:
the second conductive layer is electrically connected to the signal processing circuit,
the battery is electrically connected to the charging circuit,
the second conductive layer and the battery are provided over the same side of the first flexible substrate, and
the charging circuit includes a regulator for controlling voltage and a diode having a rectification property,
the second conductive layer is configured to receive a wireless signal,
the first conductive layer and the battery are provided over and in direct contact with a surface of the insulating film, and
the second conductive layer is provided over and in direct contact with the first conductive layer and the surface of the insulating film.

12. The semiconductor device according to claim 11, wherein the battery is positioned to overlap with the charging circuit.

13. A semiconductor device comprising:
a signal processing circuit over a first flexible substrate and having a charging circuit, the signal processing circuit including a first thin film transistor, and the charging circuit including a second thin film transistor;
an insulating film over the first thin film transistor and the second thin film transistor;
a first conductive layer over the insulating film;
a second conductive layer over the insulating film;
a battery over the insulating film; and
a second flexible substrate over the second conductive layer and the battery,
wherein:
the second conductive layer is electrically connected to the first thin film transistor through the insulating film,
the battery is electrically connected to the second thin film transistor through the insulating film,
the second conductive layer and the battery are provided over the same side of the first flexible substrate, and
the charging circuit includes a regulator for controlling voltage and a diode having a rectification property,
the second conductive layer is configured to receive a wireless signal,
the first conductive layer and the battery are provided over and in direct contact with a surface of the insulating film, and
the second conductive layer is provided over and in direct contact with the first conductive layer and the surface of the insulating film.

14. The semiconductor device according to claim 13, wherein the battery is positioned to overlap with the charging circuit.

* * * * *

UNITED STATES PATENT AND TRADEMARK OFFICE
CERTIFICATE OF CORRECTION

| | | |
|---|---|---|
| PATENT NO. | : 8,517,275 B2 | Page 1 of 1 |
| APPLICATION NO. | : 12/003147 | |
| DATED | : August 27, 2013 | |
| INVENTOR(S) | : Tsuchiya | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 420 days.

Signed and Sealed this
Twenty-fourth Day of March, 2015

Michelle K. Lee
*Director of the United States Patent and Trademark Office*